United States Patent
Kaehr et al.

(10) Patent No.: US 11,718,115 B2
(45) Date of Patent: Aug. 8, 2023

(54) ARCHITECTED STAMPS FOR LIQUID TRANSFER PRINTING

(71) Applicant: National Technology & Engineering Solutions of Sandia, LLC, Albuquerque, NM (US)

(72) Inventors: Bryan James Kaehr, Albuquerque, NM (US); Michael Alfonso Gallegos, Albuquerque, NM (US); Chelsea M. Garcia, Golden, CO (US); Peter Randall Schunk, Albuquerque, NM (US); Ethan Benjamin Secor, Ames, IA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 5 days.

(21) Appl. No.: 17/102,011

(22) Filed: Nov. 23, 2020

(65) Prior Publication Data
US 2021/0155023 A1 May 27, 2021

Related U.S. Application Data

(60) Provisional application No. 62/941,091, filed on Nov. 27, 2019.

(51) Int. Cl.
*B41K 3/54* (2006.01)
*B33Y 80/00* (2015.01)
(52) U.S. Cl.
CPC ............ *B41K 3/54* (2013.01); *B33Y 80/00* (2014.12)

(58) Field of Classification Search
CPC .................... B41K 3/54; B33Y 80/00
See application file for complete search history.

(56) References Cited

U.S. PATENT DOCUMENTS

| 3,264,720 A * | 8/1966 | Mott .................... B22F 3/1109 |
| | | 65/182.2 |
| 6,739,255 B2 * | 5/2004 | Blees ..................... B41K 1/52 |
| | | 101/327 |
| 7,963,085 B2 | 6/2011 | Sypeck et al. |
| 8,453,569 B2 * | 6/2013 | Bietsch ................ B01L 3/0293 |
| | | 101/401 |
| 10,118,426 B2 | 11/2018 | Hart et al. |

(Continued)

FOREIGN PATENT DOCUMENTS

| CN | 108389258 | * | 8/2018 | ............ G06F 30/23 |
| CN | 204592130 | * | 8/2018 | ............ G06F 30/23 |

(Continued)

OTHER PUBLICATIONS

Alderson, A. and Alderson, K. I., "Auxetic Materials," Journal of Aerospace Engineering Proc. IMechE 2007, vol. 221 (Part G), pp. 565-575.

(Continued)

*Primary Examiner* — Christopher E Mahoney
*Assistant Examiner* — Marissa Ferguson-Samreth
(74) *Attorney, Agent, or Firm* — Kevin W. Bieg; Helen S. Baca

(57) ABSTRACT

The present invention relates to architected stamps having beneficial printing properties. In particular, negative Poisson ratio structures and/or porous reservoirs can be employed to control fluid dynamics and to provide metered ink transfer.

19 Claims, 15 Drawing Sheets

(56) References Cited

U.S. PATENT DOCUMENTS

| | | | |
|---|---|---|---|
| 10,583,677 B2* | 3/2020 | Hart | B41F 5/24 |
| 2006/0180505 A1 | 8/2006 | Alderson et al. | |
| 2017/0363953 A1* | 12/2017 | Steinhart | B82Y 10/00 |
| 2020/0346476 A1* | 11/2020 | Hart | B41N 1/12 |

FOREIGN PATENT DOCUMENTS

| | | | | |
|---|---|---|---|---|
| KR | 102156263 | * | 2/2019 | |
| WO | WO-2015109359 A1 | * | 7/2015 | B29C 44/357 |
| WO | 2019135757 | * | 7/2019 | B41M 1/42 |

OTHER PUBLICATIONS

Adler, L. et al.," The Effect of a Negative Poisson's Ratio on Thermal Stresses in Cellular Metallic Structures," Smart Mater. Struct., 2016, vol. 25,115038, 9 pages.

Babaee, S. et al., "3D Soft Metamaterials with Negative Poisson's Ratio," Advanced Materials, 2013, vol. 25, pp. 5044-5049.

Bowick, M. et al., "Universal Negative Poisson Ratio of Self-Avoiding Fixed-Connectivity Membranes," Physical Review Letters, 2001, vol. 87, pp. 148103-1-148103-4.

Caddock, B.D. and Evans, K. E. "Microporous Materials with Negative Poisson's Ratios: I. Microstructure and Mechanical Properties," Journal of Physics D: Applied Physics, 1989, vol. 22, pp. 1877-1882.

Clausen, A. et al., "Topology Optimized Architectures with Programmable Poisson's Ratio over Large Deformations," Advanced Materials, 2015, vol. 27, pp. 5523-5527.

Fozdar, D.Y. et al., "Three-Dimensional Polymer Constructs Exhibiting a Tunable Negative Poisson's Ratio," Advanced Functional Materials, 2011, vol. 21, pp. 2712-2720.

Gao, Z. et al., "Two-Dimensional Mechanical Metamaterials with Unusual Poisson Ratio Behavior," Physical Review Applied, 2018, vol. 10, pp. 064039-1-064039-8.

Greaves, G.N. et al., "Poisson's Ratio and Modern Materials," Nature Materials, 2011, vol. 10. pp. 823-837.

Lakes, R., "Advances in Negative Poisson's Ratio Materials," Advanced Materials, 1993, vol. 5, pp. 293-296.

Lakes, R., "Deformation Mechanisms in Negative Poisson's Ratio Materials: Structural Aspects," Journal of Materials Science, 1991, vol. 26, pp. 2287-2292.

Lakes, R., "Materials with Structural Hierarchy," Nature, 1993, vol. 361, pp. 511-515.

Lakes, R. and Wojciechowski, K. W. "Negative Compressibility, Negative Poisson's Ratio, and Stability," Physica Status Solidi B, 2008, vol. 245, pp. 545-551.

Larsen, U.D. et al., "Design and Fabrication of Compliant Micromechanisms and Structures with NegativePoisson's Ratio," Journal of Microelectromechanical Systems, 1997, vol. 6, pp. 99-106.

Novikov, V. and Wojciechowski, K. W, "Negative Poisson Coefficient of Fractal Structures", Physics of the Solid State, 1999, vol. 41, pp. 1970-1975.

Pikhitsa, P., "Architecture of Cylinders with Implications for Materials with Negative Poisson Ratio," Physica Status Solidi B, 2007, vol. 244, pp. 1004-1007.

Prall, D. and Lakes, R. S. "Properties of a Chiral Honeycomb with a Poisson's Ratio—1," International Journal of Mechanical Science, 1997, vol. 39, pp. 305-314.

Prawoto, Yunan, "Seeing Auxetic Materials from the Mechanics Point of View: A Structural Review on the Negative Poisson's Ratio," Computational Materials Science, 2012, vol. 58, pp. 140-153.

Qin, D. et al., "Rapid Prototyping of Complex Structures with Feature Sizes Larger Than 20 μm," Advanced Materials, 1996, vol. 8, pp. 917-919.

Saxena, K. et al., "Three Decades of Auxetics Research—Materials with Negative Poisson's Ratio: A Review," Advanced Engineering Materials, 2016, vol. 18, pp. 1847-1870.

Scarpa, F. and Tomlin, P. J. "On the Transverse Shear Modulus of Negative Poisson's Ratio Honeycomb Structures," Fatigue & Fracture of Engineering Materials & Structures, 2000, vol. 23, pp. 717-720.

Sigmund, O., "Tailoring Materials with Prescribed Elastic Properties", Mechanics of Materials, 1995, vol. 20, pp. 351-368.

Theocaris, P. S. et al., "Negative Poisson's Ratios in Composites with Star-Shape Inclusions: A Numerical Homogenization Approach," Archive of Applied Mechanics, 1997, vol. 67, pp. 274-286.

Wan, H. et al., "A Study of Negative Poisson's Ratios in Auxetic Honeycombs Based on a Large Deflection Model," European Journal of Mechanics A Solids, 2004, vol. 23, pp. 95-106.

Wojciechowski, K. W. "Two-Dimensional Isotropic System with a Negative Poisson Ratio," Physical Letters A, 1989, vol. 137, pp. 60-64.

Xu, B. et al., "Making Negative Poisson's Ratio Microstructures by Soft Lithography," Advanced Materials, 1999, vol. 11, pp. 1186-1189.

Yang, L. et al., "Mechanical Properties of 3D Re-Entrant Honeycomb Auxetic Structures Realized via Additive Manufacturing," International Journal of Solids and Structures, 2015, vol. 69-70, pp. 475-490.

Zhu, H. X. et al., "Composite Materials with Enhanced Dimensionless Young's Modulus and Desired Poisson's Ratio," Scientific Reports, 2015, vol. 5, 14103, 8 pages.

Bauer, J. et al., "Nanolattices: An Emerging Class of Mechanical Metamaterials," Advanced Materials, 2017, vol. 29, 1701850, 26 pages.

Hirt, L. et al., "Additive Manufacturing of Metal Structures at the Micrometer Scale," Advanced Materials, 2017, vol. 29, 1604211, 30 pages.

Kim, S. et al., "Ultrathin High-Resolution Flexographic Printing Using Nanoporous Stamps," Science Advances, 2016, vol. 2, e 1601660, 11 pages.

Mariappan, D.D. et al., "Dynamics of Liquid Transfer from Nanoporous Stamps in High-Resolution Flexographic Printing," Langmuir, 2019, vol. 35, pp. 7659-7671.

Lafratta, C.N. et al., "Multiphoton Fabrication," Angew. Chem. Int'l Ed. Engl., vol. 46, pp. 6238-6258.

Maruo, S. and Fourkas, J.T. "Recent Progress in Multiphoton Microfabrication," Laser & Photonics Review, 2008, vol. 2, pp. 100-111.

Bertoldi, K. et al., "Flexible Mechanical Metamaterials," Nature Reviews Materials, 2017, vol. 2,17066, 11 pages.

Barner-Kowollik, C. et al., 3D Laser Micro- and Nanoprinting: Challenges for Chemistry, Angew. Chem. Int. Ed., 2017, vol. 56, pp. 15828-15845.

Kang, S.H. et al., Meniscus Lithography: Evaporation-Induced Self-Organization of Pillar Arrays into Moiré Patterns, Physical Review Letters, 2011, vol. 107, pp. 177802-1-177802-5.

* cited by examiner

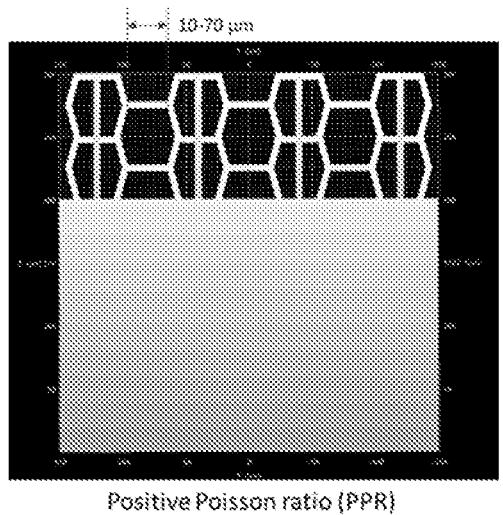
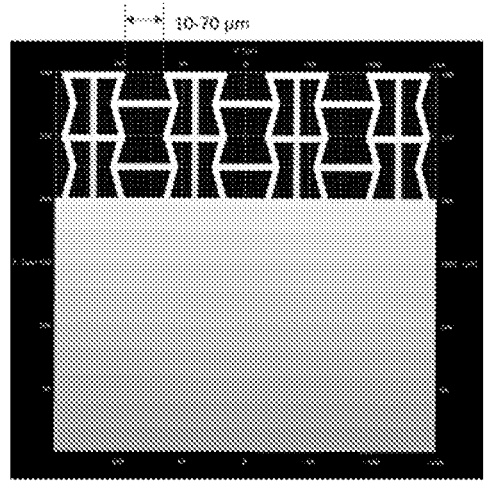
FIG. 8A      FIG. 8B
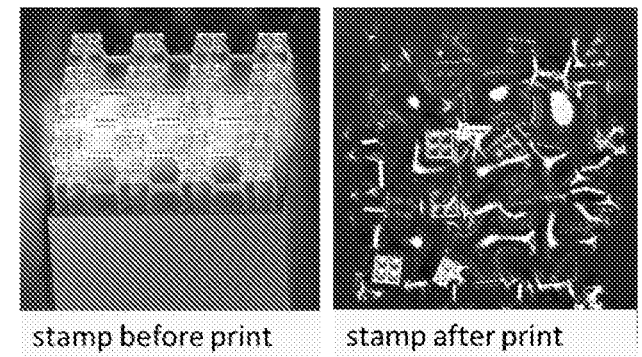
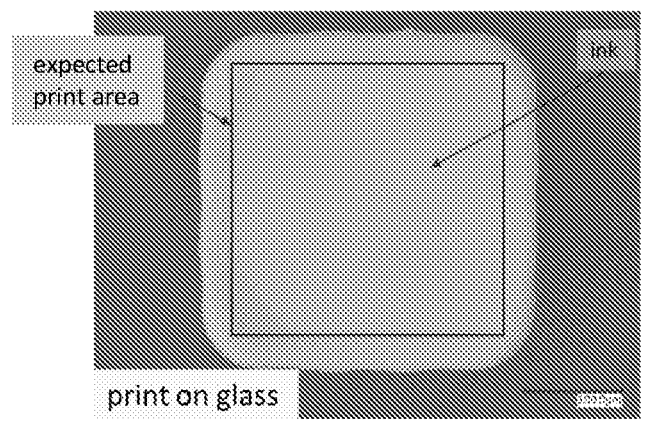
FIG. 8C

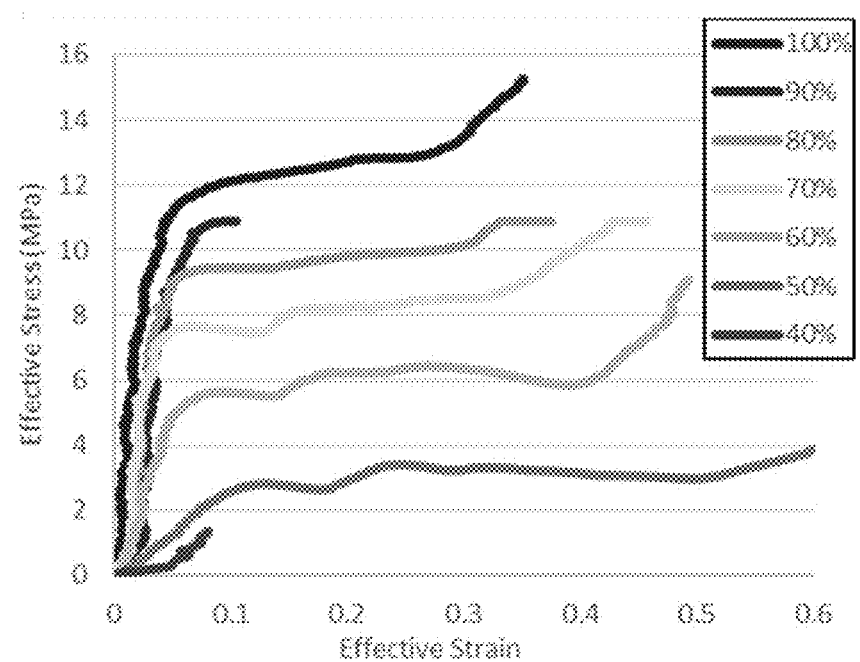
FIG. 10C
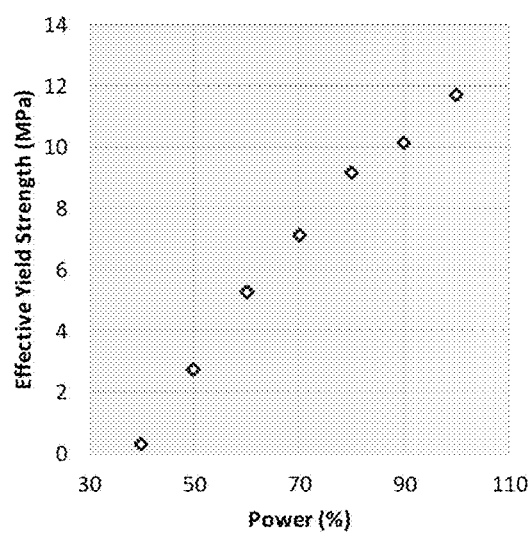 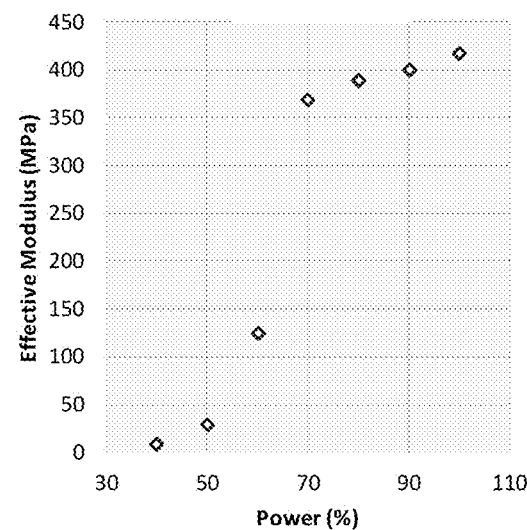
FIG. 10D  FIG. 10E

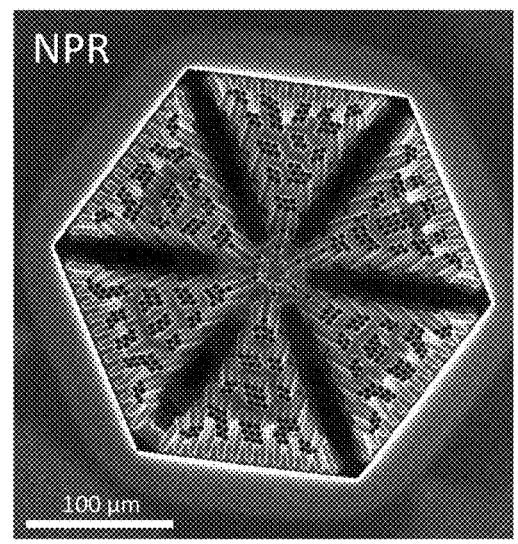
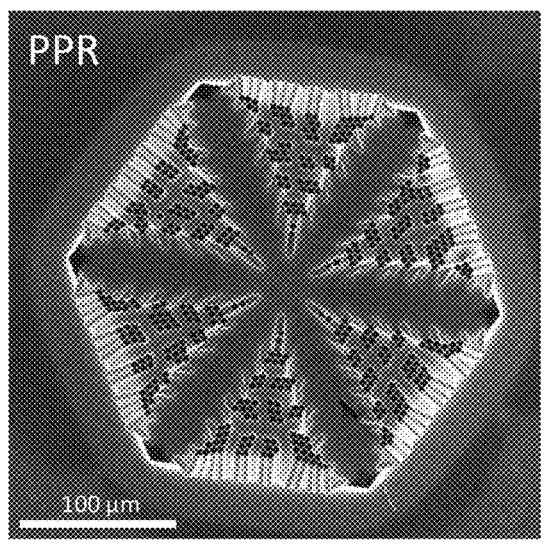
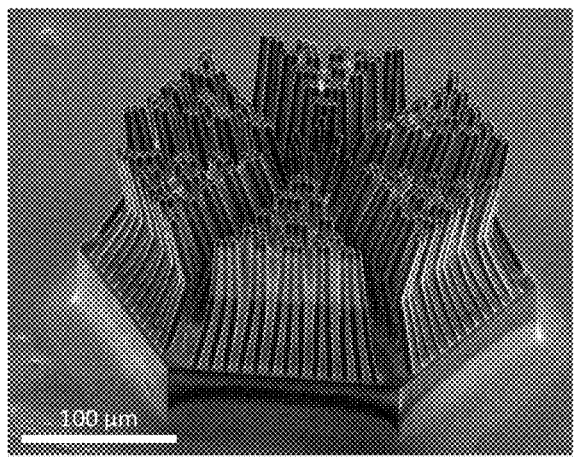
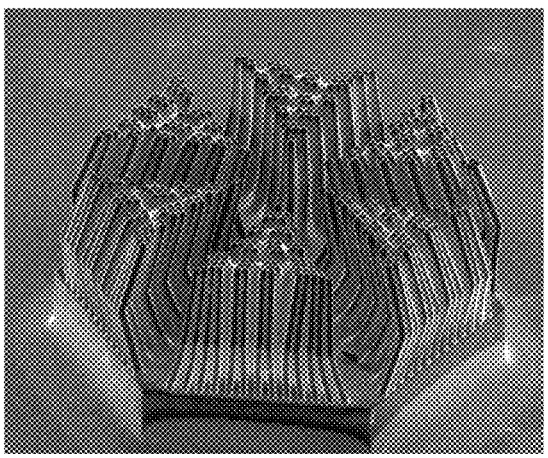
FIG. 12A                                   FIG. 12B Conventional solid flexographic stamp – competition between wetting on stamp and substrate drives ink transfer Significant difference for porous stamp – suction force pulling fluid back into the stamp

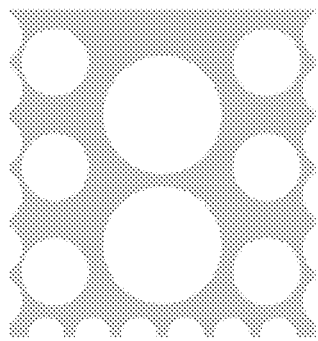
Large interior pores act as fluid reservoir
Pore Size Distribution
FIG. 14A
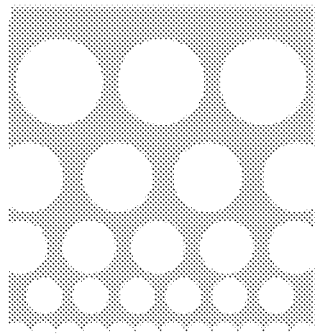
Pore Size Distribution
Small pores at contact surface draw ink down
FIG. 14B
1D NPR contact surface
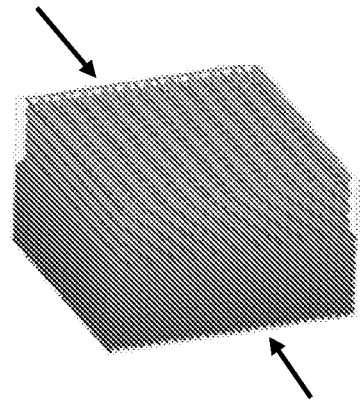
50% pore volume fluid reservoir
1D PPR contact surface
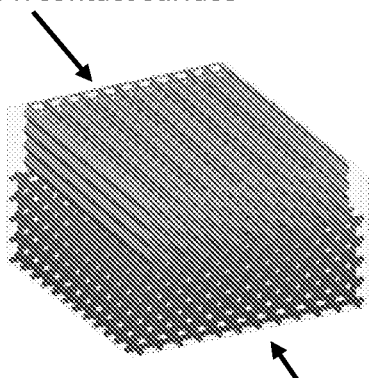
87% pore volume fluid reservoir
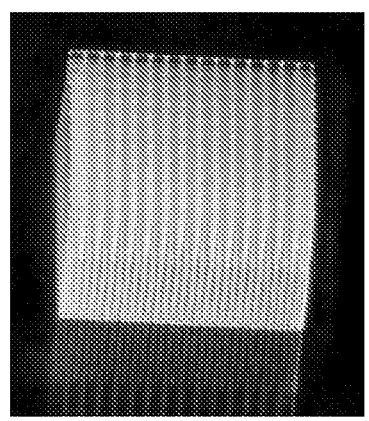
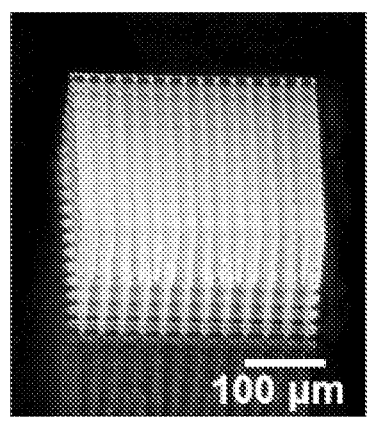
100 μm
FIG. 15A

ARCHITECTED STAMPS FOR LIQUID TRANSFER PRINTING

CROSS-REFERENCE TO RELATED APPLICATION

This application claims the benefit of U.S. Provisional Application No. 62/941,091, filed Nov. 27, 2019, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to architected stamps having beneficial printing properties. In particular, negative Poisson ratio structures and/or porous reservoirs can be employed to control fluid dynamics and to provide metered ink transfer.

BACKGROUND OF THE INVENTION

Mass production printing processes require improvements to facilitate microscale or even nanoscale printing in emerging areas, such as printed electronics. Controlling fluid dynamics at such a scale remains challenging. For example, capillary forces and mechanical deformation of a stamp could play important roles in providing desired print patterns, yet controlling such forces at the micron-level needs to be more fully understood. Thus, there is a need for advanced ink transfer processes to increase print fidelity and film uniformity.

SUMMARY OF THE INVENTION

The present invention relates to architected stamps having structural features that enhance ink transfer to a substrate. For instance, the architected stamp can include a porous reservoir (e.g., a microporous reservoir) for precise ink metering. In another instance, the architected stamp can include an ink transfer component characterized by a negative Poisson ratio, in which the extent of mechanical deformation can be a controllable design criteria. Additional details follow.

Definitions

As used herein, the term "about" means+/−10% of any recited value. As used herein, this term modifies any recited value, range of values, or endpoints of one or more ranges.

By "fluidic communication," as used herein, refers to any duct, channel, tube, pipe, chamber, or pathway through which a substance, such as a liquid, gas, or solid may pass substantially unrestricted when the pathway is open. When the pathway is closed, the substance is substantially restricted from passing through. Typically, limited diffusion of a substance through the material of a plate, base, and/or a substrate, which may or may not occur depending on the compositions of the substance and materials, does not constitute fluidic communication.

By "micro" is meant having at least one dimension that is less than 1 mm and, optionally, equal to or larger than about 1 µm. For instance, a microstructure (e.g., any structure described herein) can have a length, width, height, cross-sectional dimension, circumference, radius (e.g., external or internal radius), or diameter that is less than 1 mm.

By "nano" is meant having at least one dimension that is less than 1 µm but equal to or larger than about 1 nm. For instance, a nanostructure (e.g., any structure described herein, such as a nanoparticle) can have a length, width, height, cross-sectional dimension, circumference, radius (e.g., external or internal radius), or diameter that is less than 1 µm but equal to or larger than 1 nm. In other instances, the nanostructure has a dimension that is of from about 1 nm to about 1 µm.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

indicates the solid block. Data shown in (A) and (B) represents the mean value and standard deviation.

Figure 7A:
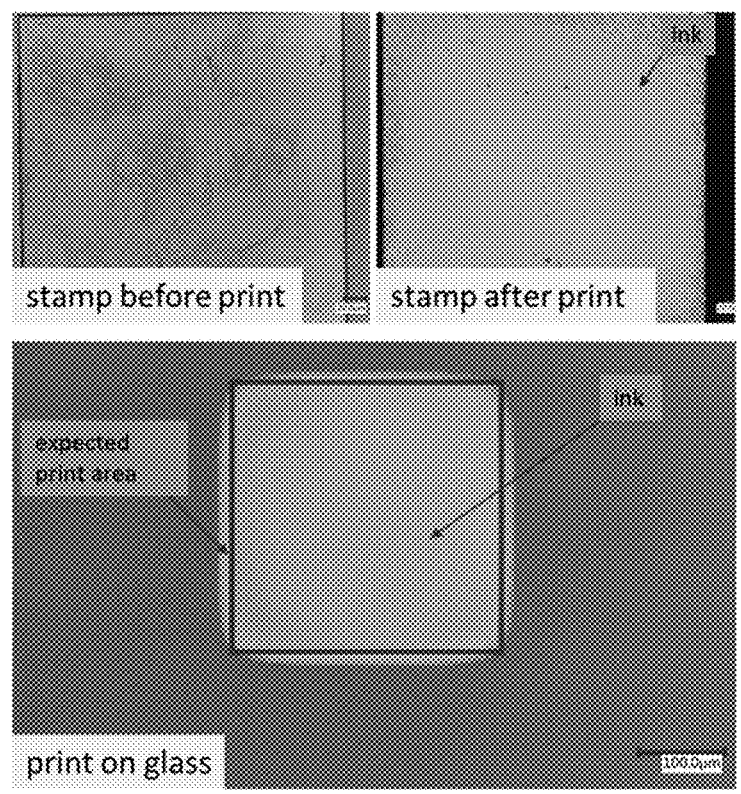
Figure 7B:
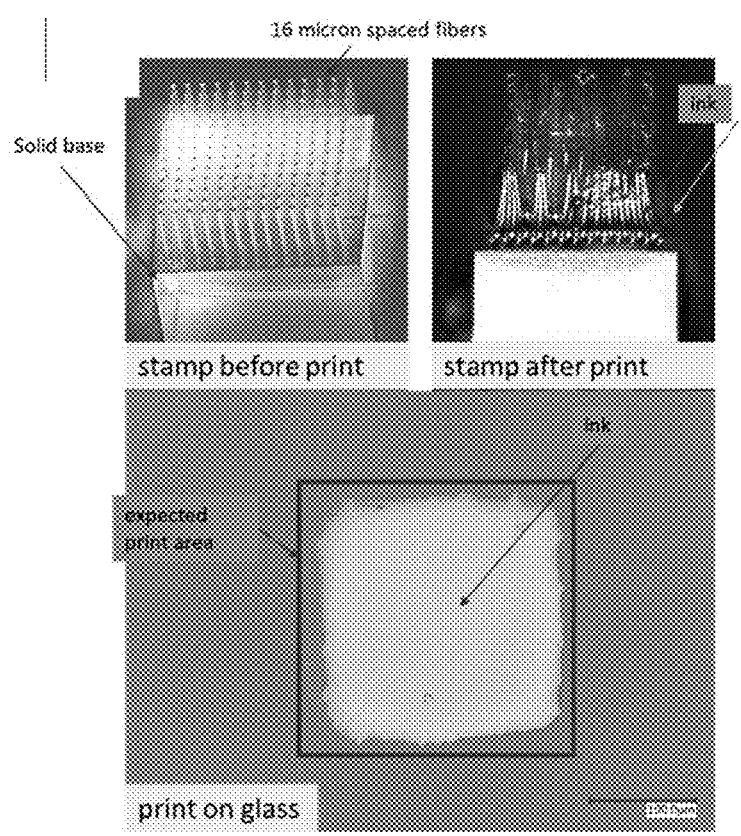

FIG. 7A-7B shows printing results for a solid block stamp and a fiber-based stamp. Provided are images for (A) a solid 300×300 block before and after stamping (top), as well as the printed area compared to the expected area (bottom); and (B) a fiber-based stamp before and after stamping (top), as well as the printed area compared to the expected area (bottom). The fiber-based stamp included a solid reservoir and an ink transfer component having a plurality of fiber-based printing elements and having a spacing of 16 µm between fibers.

FIG. 8A-8D shows exemplary ink transfer components and printing results. Provided are side view schematics of (A) an exemplary ink transfer component designed to display positive Poisson's ratio (PPR) upon compression and (B) an exemplary ink transfer component designed to display negative Poisson's ratio (NPR) upon compression. Also provided are images of (C) a PPR stamp before and after stamping (top), as well as the printed area compared to the expected area (bottom); and (D) an NPR stamp before and after stamping (top), as well as the printed area compared to the expected area (bottom).

Figure 8D:
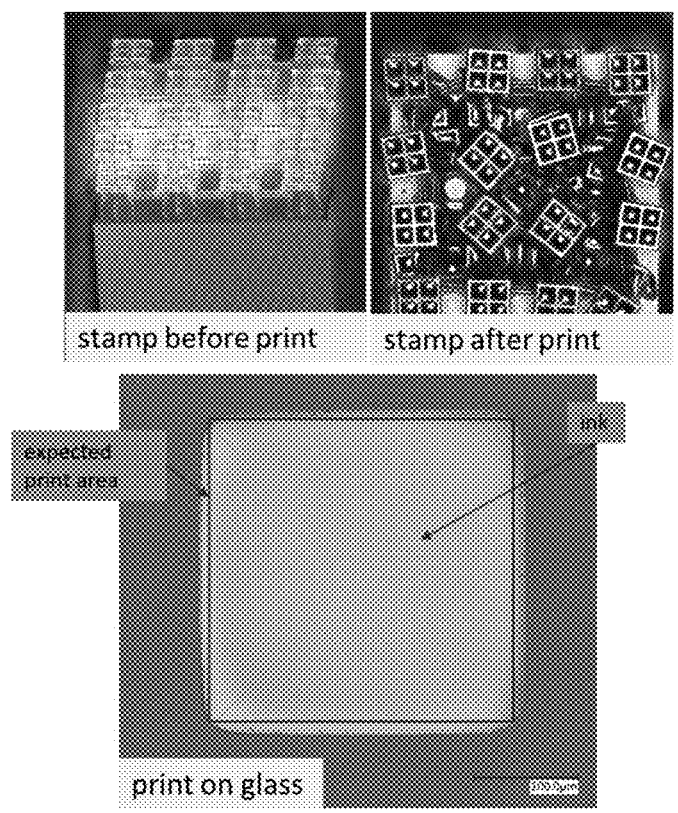
Figure 9A:
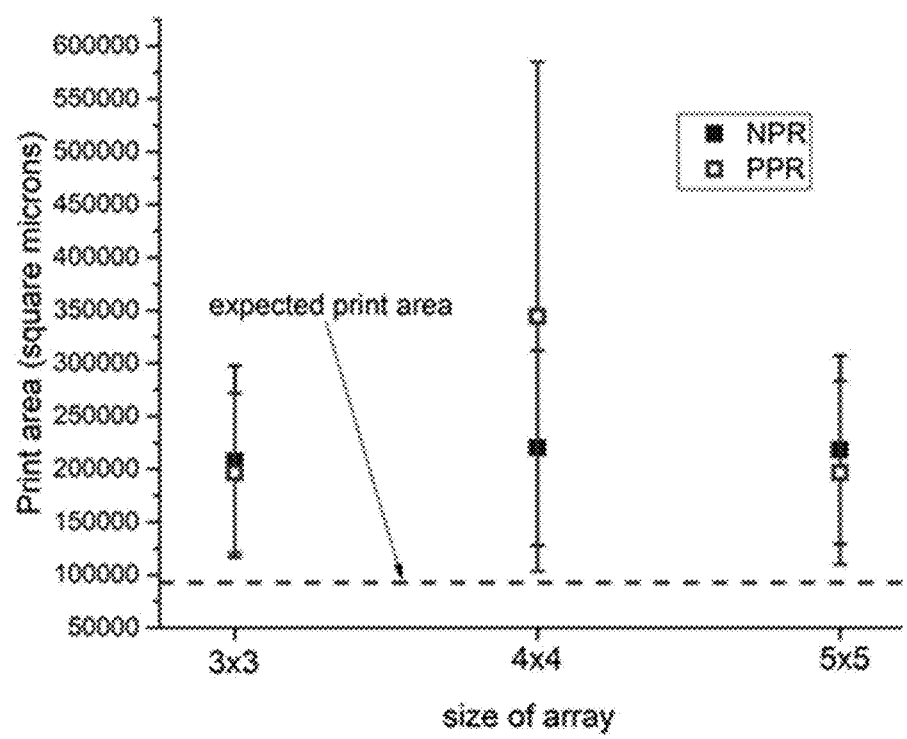
Figure 9B:
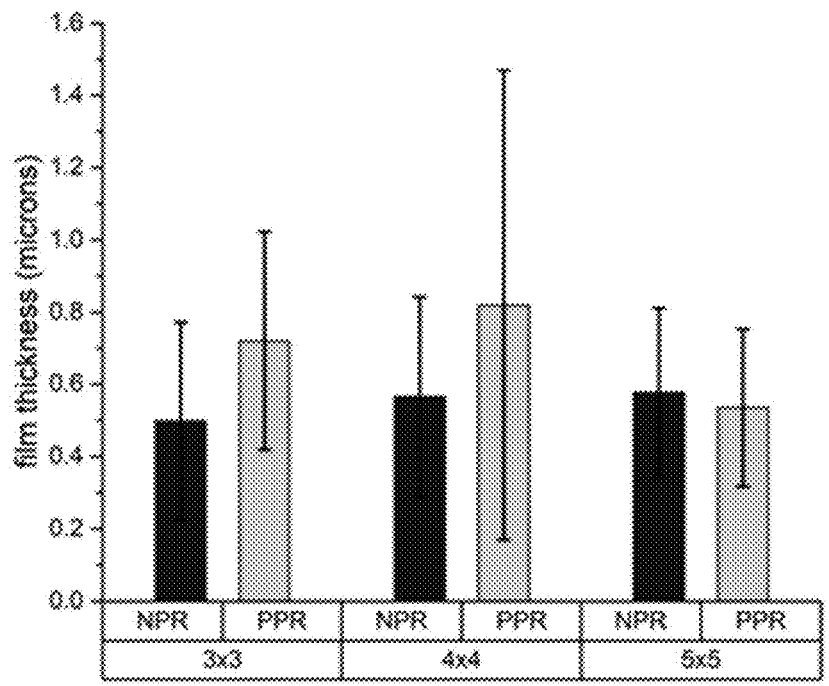

FIG. 9A-9B shows printing results for exemplary PPR and NPR stamps shown in FIG. 8A-8D. Provided are (A) the measured print area for exemplary NPR and PPR stamps, in which the dotted line indicates the expected print area; and (B) a comparison of film thickness for NPR and PPR designs with varying density. Data shown in A and B represent the mean value and standard deviation.

FIG. 10A-10E shows open cell microscale stamp fabrication and mechanical testing. Provided are (A) a schematic (left) and an image (right) of a microscale porous lattice stamp with buckling characteristics; (B) images of stamps produced with increase laser power (from 40% to 100%); (C) a plot of effective stress and strain for stamps with different fabrication parameters from compression testing; and graphs showing (D) resulting effective yield strength and (E) resulting effective modulus relating to stiffness for these stamps as a function of laser power.

Figure 11A:
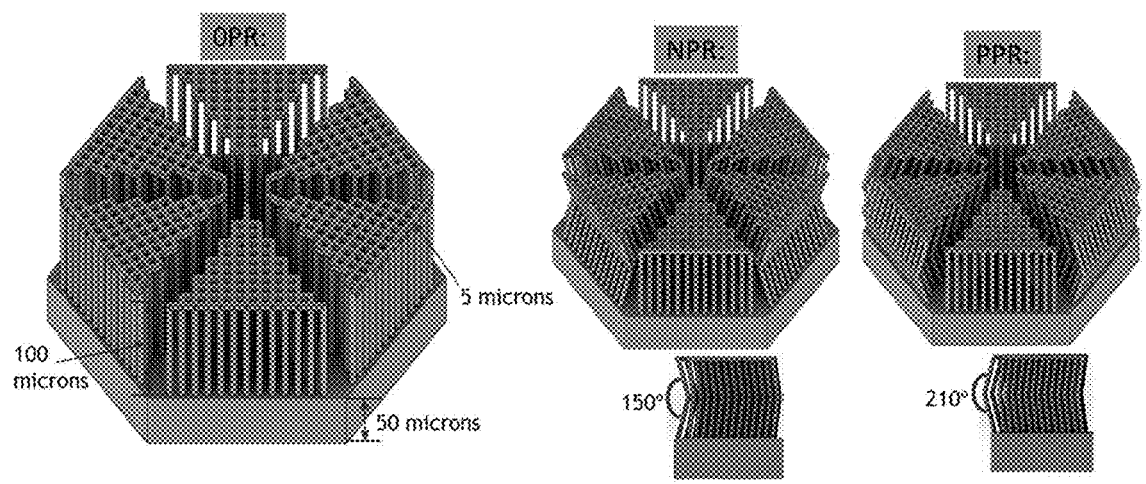
Figure 11B:
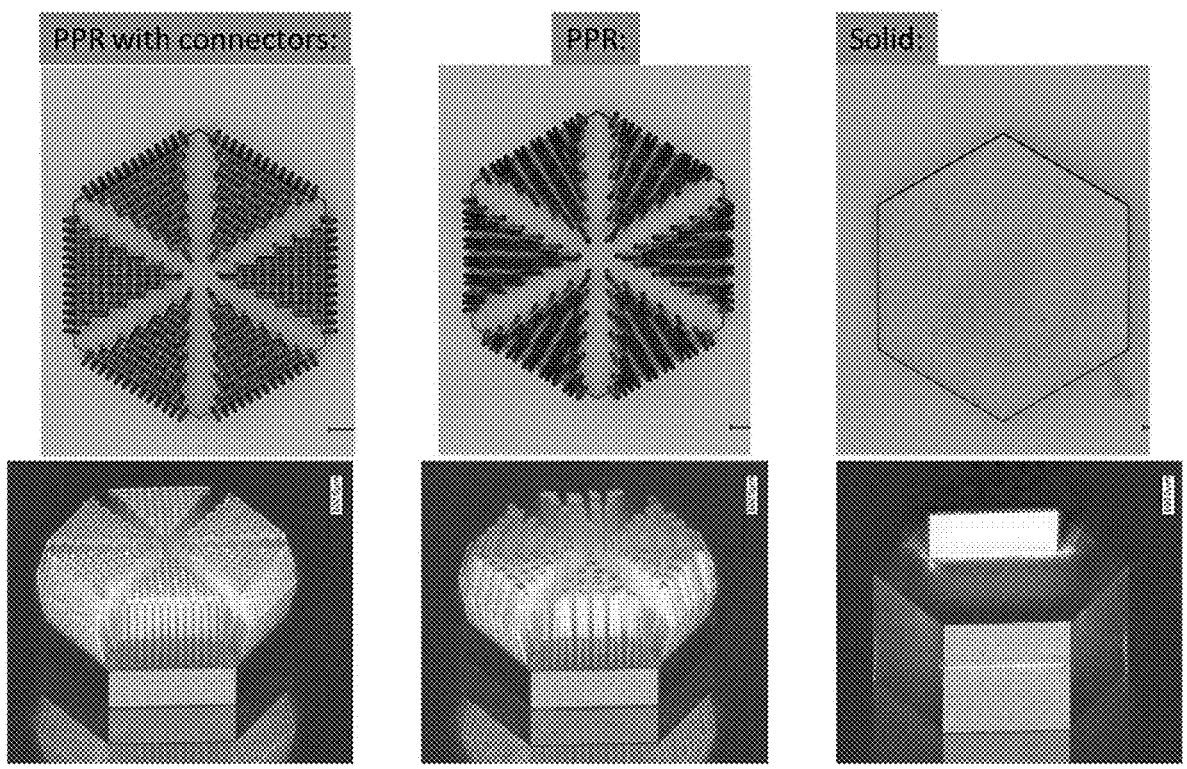

FIG. 11A-11B shows exemplary hexagon-shaped stamps. Provided are (A) schematics of exemplary hexagon-shaped stamps having zero Poisson's ration (0PR), negative Poisson's ratio (NPR), or positive Poisson's ratio (PPR); and (B) images of stamps with and without top connectors (or struts).

FIG. 12A-12B shows scanning electron microscopy (SEM) images of an exemplary hexagon-shaped (A) NPR stamp and (B) PPR stamp, including a top view (top) and perspective view (bottom).

FIG. 13A-13D shows schematic of a flexo process with (A) a solid stamp and (B) a porous stamp, which can include a porous reservoir and/or a porous ink transfer component. As seen in (C), for a porous stamp, competition between the capillary pressure in the stamp and the meniscus pressure upon takeaway can drive ink transfers. As seen in (D), the built-in hysteresis of the capillary pressure to saturation relationship may be modified under non-equilibrium (dynamic) properties.

FIG. 14A-14B shows exemplary pores within a porous reservoir. Provided are schematics showing (A) a pore size distribution gradient to pool a fluid (e.g., an ink) or (B) a pore size gradient to directionally wick a fluid.

Figure 15B:
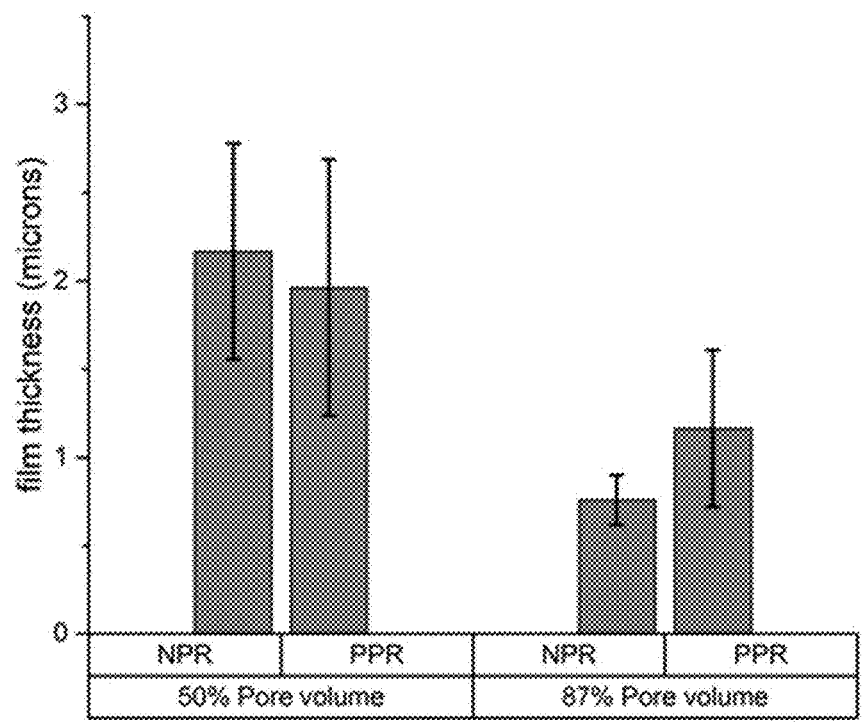

FIG. 15A-15B shows exemplary stamps having an ink transfer component (e.g., an NPR or a PPR ink transfer component) in fluidic contact with a porous reservoir. Provided are (A) schematics (top) and images (bottom) of stamps having a simple step gradient of pores within the reservoir, as well as a compliant ink transfer component that is stacked onto a porous reservoir with higher or lower pore volume; and (B) measured film thickness as a function of reservoir volume and NPR/PPR topside.

Figure 16:
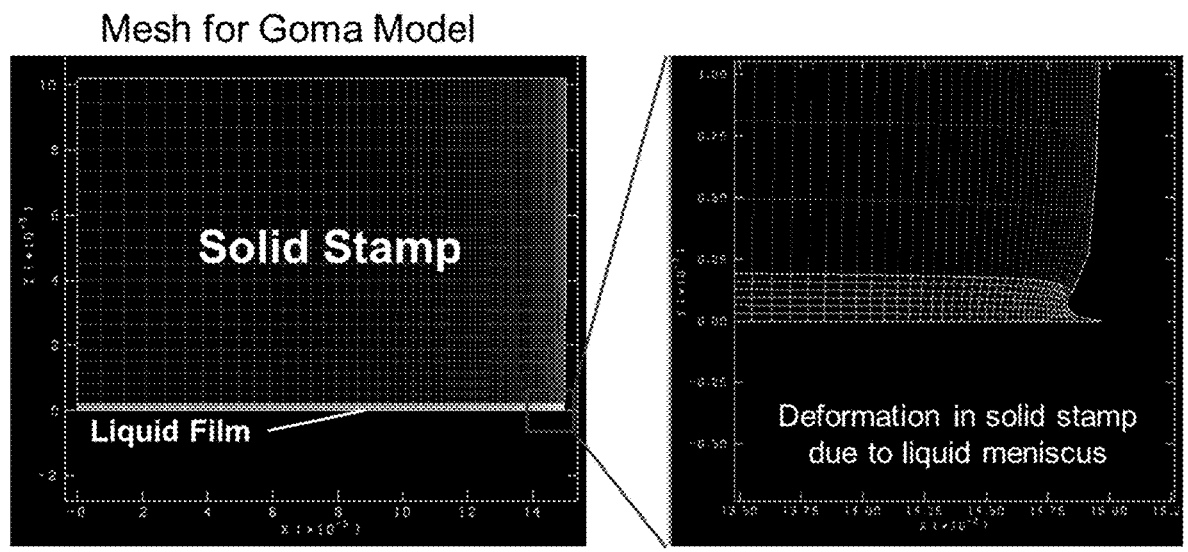

FIG. 16 shows exemplary screen shots from a preliminary Goma run with a solid stamp, which shows deformation in the stamp due to capillary forces at the meniscus.

DETAILED DESCRIPTION OF THE INVENTION

The present invention relates to architected stamps and uses thereof (e.g., to print microscale features). As described herein, an architected stamp can include a reservoir and an ink transfer component disposed at the distal portion of the reservoir. The ink transfer component possesses the desired pattern, e.g., a pattern having microscale features, to be printed. The ink transfer component, in turn, includes a plurality of printing elements (e.g., an array of printing elements), which can be mechanically deformed to deliver ink to the substrate. In some embodiments, the printing element includes nanoscale features (e.g., nanoscale struts, walls, joints, etc.) formed by additive manufacturing and designed to possess a negative Poisson's ratio.

The stamp can be characterized by one or more porous structures. In one embodiment, the stamp includes a porous reservoir, in which the pores within the reservoir can retain ink and provide sufficient capillary pressure to wick into the pores and away from a substrate. In another embodiment, the stamp includes a porous ink transfer component, in which pores or voids are provided by spaces within a printing element and/or spaces between two or more printing elements. These pores or voids are suitable for retaining ink, and compression of the ink transfer component results in metering of ink out of the printing element and onto a substrate.

Figure 1A:
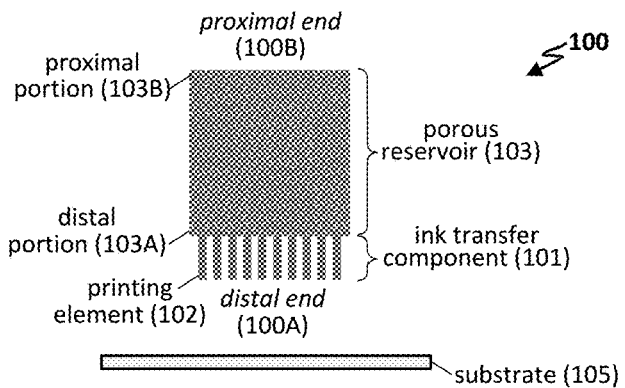
FIG. 1A-1C shows exemplary components of an architected stamp. Provided are schematics of (A) an exemplary architected stamp 100 having a porous reservoir 103 and an ink transfer component 101 disposed at the distal portion 103A of the reservoir; (B) another exemplary stamp having a plurality of printing elements 112-115; and (C) yet another exemplary stamp having a plurality of printing elements 122-125, in which an internal strut 126 may be present within a printing cell and an external strut 127 may be present between printing elements.

FIG. 1A shows an exemplary architected stamp 100 having a porous reservoir 103 and an ink transfer component 101 disposed at a distal portion 103A of the reservoir. The reservoir can include a contact surface disposed at the distal portion 103A of the reservoir. The contact surface provides a surface through which ink can be transferred from the reservoir to the ink transfer component. In some embodiments, the pores within the porous reservoir are in fluidic communication with the contact surface.

The ink transfer component includes a plurality of printing elements 102 configured to contact the substrate 105 and print the desired pattern of the ink transfer component. In particular embodiments, each of the printing elements is in fluidic communication with the contact surface, thereby providing fluidic flow of ink between the reservoir and the ink transfer component. Methods of printing can include contacting a distal end 100A of the stamp to the substrate. Such contacting can include applying additional pressure to a proximal portion 103B or a proximal end 100B of the stamp.

Figure 1B:
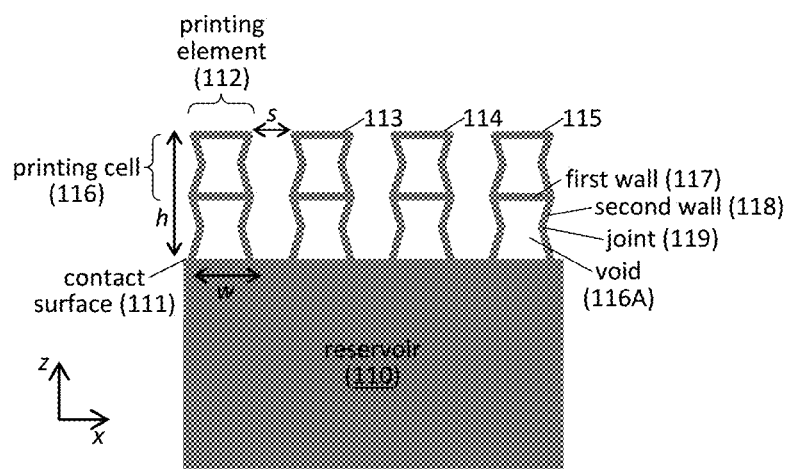

The printing element can be designed to control fluidic flow of ink from the reservoir to the ink transfer substrate and/or from the ink transfer component to the substrate. FIG. 1B provides an exemplary stamp having a reservoir 110 and a plurality of printing elements 112,113,114,115 disposed on the contact surface 111 of the reservoir. The printing element can have any useful height h and width w (e.g., including a diameter). The height h and width w can be any useful value, such as of from about 2 µm to about 1000 µm (e.g., from about 2 µm to 10 µm, 2 µm to 25 µm, 2 µm to 50 µm, 2 µm to 75 µm, 2 µm to 100 µm, 2 µm to 250 µm, 2 µm to 500 µm, 2 µm to 750 µm, 2 µm to 900 µm, 5 µm to 10 µm, 5 µm to 25 µm, 5 µm to 50 µm, 5 µm to 75 µm, 5 µm to 100 µm, 5 µm to 250 µm, 5 µm to 500 µm, 5 µm to 750 µm, 5 µm to 900 µm, 5 µm to 1000 µm, 10 µm to 25 µm, 10 µm to 50 µm, 10 µm to 75 µm, 10 µm to 100 µm, 10 µm to 250 µm, 10 µm to 500 µm, 10 µm to 750 µm, 10 µm to 900 µm, 10 µm to 1000 µm, 20 µm to 20 µm to 50 µm, 20 µm to 75 µm, 20 µm to 100 µm, 20 µm to 250 µm, 20 µm to 500 µm, 20 µm to 750 µm, 20 µm to 900 µm, 20 µm to 1000 µm, 50 µm to 75 µm, 50 µm to 100 µm, 50 µm to 250 µm, 50 µm to 500 µm, 50 µm to 750 µm, 50 µm to 900 µm, 50 µm to 1000 µm, 100 µm to 250 µm, 100 µm to 500 µm, 100 µm to 750 µm, 100 µm to 900 µm, 100 µm to 1000 µm, 200 µm to 500 µm, 200 µm to 750 µm, 200 µm to 900 µm, 200 µm to 1000 µm, 300 µm to 500 µm, 300 µm to 750 µm, 300 µm to 900 µm, 300 µm to 1000 µm, 400 µm to 500 µm, 400 µm to 750 µm, 400 µm to 900 µm, 400 µm to 1000 µm, 500 µm to 750 µm, 500 µm to 900 µm, 500 µm to 1000 µm, 600 µm to 750 µm, 600 µm to 900 µm, 600 µm to 1000 µm, 700 µm to 750 µm, 700 µm to 900 µm, 700 µm to 1000 µm, 800 µm to 900 µm, 800 µm to 1000 or 900 µm to 1000 µm).

The ratio of w to h can be any useful value, such as of from about 1:1 to 1:100 (e.g., from about 1:1 to 1:5, 1:1 to 1:10, 1:1 to 1:15, 1:1 to 1:20, 1:1 to 1:25, 1:1 to 1:30, 1:1 to 1:35, 1:1 to 1:40, 1:1 to 1:45, 1:1 to 1:50, 1:1 to 1:60, 1:1 to 1:70, 1:1 to 1:75, 1:1 to 1:80, 1:1 to 1:90, 1:1 to 1:95, 1:2 to 1:5, 1:2 to 1:10, 1:2 to 1:15, 1:2 to 1:20, 1:2 to 1:25, 1:2 to 1:30, 1:2 to 1:35, 1:2 to 1:40, 1:2 to 1:45, 1:2 to 1:50, 1:2 to 1:60, 1:2 to 1:70, 1:2 to 1:75, 1:2 to 1:80, 1:2 to 1:90, 1:2 to 1:95, 1:2 to 1:100, 1:4 to 1:5, 1:4 to 1:10, 1:4 to 1:15, 1:4 to 1:20, 1:4 to 1:25, 1:4 to 1:30, 1:4 to 1:35, 1:4 to 1:40, 1:4 to 1:45, 1:4 to 1:50, 1:4 to 1:60, 1:4 to 1:70, 1:4 to 1:75, 1:4 to 1:80, 1:4 to 1:90, 1:4 to 1:95, 1:4 to 1:100, 1:5 to 1:10, 1:5 to 1:15, 1:5 to 1:20, 1:5 to 1:25, 1:5 to 1:30, 1:5 to 1:35, 1:5 to 1:40, 1:5 to 1:45, 1:5 to 1:50, 1:5 to 1:60, 1:5 to 1:70, 1:5 to 1:75, 1:5 to 1:80, 1:5 to 1:90, 1:5 to 1:95, 1:5 to 1:100, 1:8 to 1:10, 1:8 to 1:15, 1:8 to 1:20, 1:8 to 1:25, 1:8 to 1:30, 1:8 to 1:35, 1:8 to 1:40, 1:8 to 1:45, 1:8 to 1:50, 1:8 to 1:60, 1:8 to 1:70, 1:8 to 1:75, 1:8 to 1:80, 1:8 to 1:90, 1:8 to 1:95, 1:8 to 1:100, 1:10 to 1:15, 1:10 to 1:20, 1:10 to 1:25, 1:10 to 1:30, 1:10 to 1:35, 1:10 to 1:40, 1:10 to 1:45, 1:10 to 1:50, 1:10 to 1:60, 1:10 to 1:70, 1:10 to 1:75, 1:10 to 1:80, 1:10 to 1:90, 1:10 to 1:95, 1:10 to 1:100, 1:15 to 1:20, 1:15 to 1:25, 1:15 to 1:30, 1:15 to 1:35, 1:15 to 1:40, 1:15 to 1:45, 1:15 to 1:50, 1:15 to 1:60, 1:15 to 1:70, 1:15 to 1:75, 1:15 to 1:80, 1:15 to 1:90, 1:15 to 1:95, 1:15 to 1:100, 1:20 to 1:25, 1:20 to 1:30, 1:20 to 1:35, 1:20 to 1:40, 1:20 to 1:45, 1:20 to 1:50, 1:20 to 1:60, 1:20 to 1:70, 1:20 to 1:75, 1:20 to 1:80, 1:20 to 1:90, 1:20 to 1:95, or 1:20 to 1:100).

Furthermore, the spacing s between two or more printing elements can also be adjusted to provide desired fluid flow characteristics. The spacing s can be of any useful value, such as of from about 1 µm to about 50 µm (e.g., of from about 1 µm to 10 µm, 1 µm to 20 µm, 1 µm to 25 µm, 1 µm to 30 µm, 1 µm to 40 µm, 2 µm to 10 µm, 2 µm to 20 µm, 2 µm to 25 µm, 2 µm to 30 µm, 2 µm to 40 µm, 2 µm to 50 µm, 5 µm to 10 µm, 5 µm to 20 µm, 5 µm to 25 µm, 5 µm to 30 µm, 5 µm to 40 µm, 5 µm to 50 µm, 10 µm to 20 µm, 10 µm to 25 µm, 10 µm to 30 µm, 10 µm to 40 µm, 10 µm to 50 µm, 15 µm to 20 µm, 15 µm to 25 µm, 15 µm to 30 µm, 15 µm to 40 µm, 15 µm to 50 µm, 20 µm to 25 µm, 20 µm to 30 µm, 20 µm to 40 µm, 20 µm to 50 µm, 25 µm to 30 µm, 25 µm to 40 µm, 25 µm to 50 µm, 30 µm to 40 µm, 30 µm to 50 µm, 40 µm to 50 µm or 45 µm to 50 µm).

Contacting the stamp to the substrate results in compression of the printing element along axis z, and lifting off the stamp results in decompression of the printing element along axis z. The printing element can be designed to have a negative Poisson's ratio, in which compression along axis z gives a width $w_1$ along axis x and decompression gives a width $w_2$ along that same x axis, wherein $w_1$ is less than $w_2$.

Furthermore, the printing element can be composed of one or more printing cells. Within a printing element, the cells can be connected in any useful manner (e.g., by adjoining walls between cells, by one or more struts between cells, etc.). The printing cell can have any useful structure that provides beneficial fluid transfer. Each cell can include two or more walls, and a void or pore defined by those walls. FIG. 1B shows a printing element 112 comprised of two exemplary printing cells 116, each having a re-entrant honeycomb geometry that is defined by a void 116A surrounded by walls, including a horizontal wall (first wall 117, including two first walls) and a vertical wall (second wall 118, including two second walls). Furthermore, a cell's wall can include one or more other structural elements, such as a joint 119 that allows for bending of the wall either inwardly into the void or outwardly away from the void.

Figure 1C:
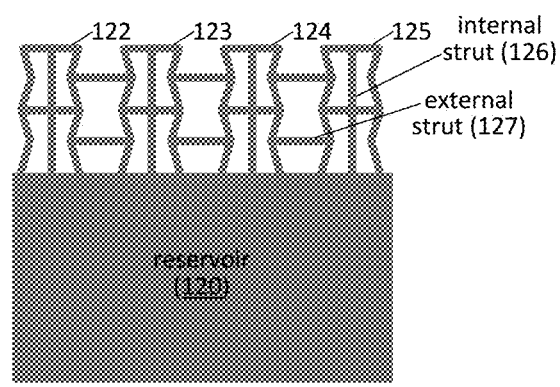

Additional elements can be employed to stabilize printing elements or printing cells. For example, an array of printing elements can be formed by controlling the spacing between the elements, thereby controlling the capillary forces formed by the printing element and/or printing cell. In another example, a strut can be located within a cell or between cells. FIG. 1C shows an exemplary stamp having a reservoir 120 and a plurality of printing elements 122,123,124,125 disposed on the contact surface of the reservoir. Furthermore, struts can be provided within a cell and/or between cells. For instance, the stamp can include a plurality of internal struts 126, including a strut within the void of a cell. In another instance, the stamp can include a plurality of external struts 127, including a strut connecting two or more cells or elements.

Figures 2A, 2B:
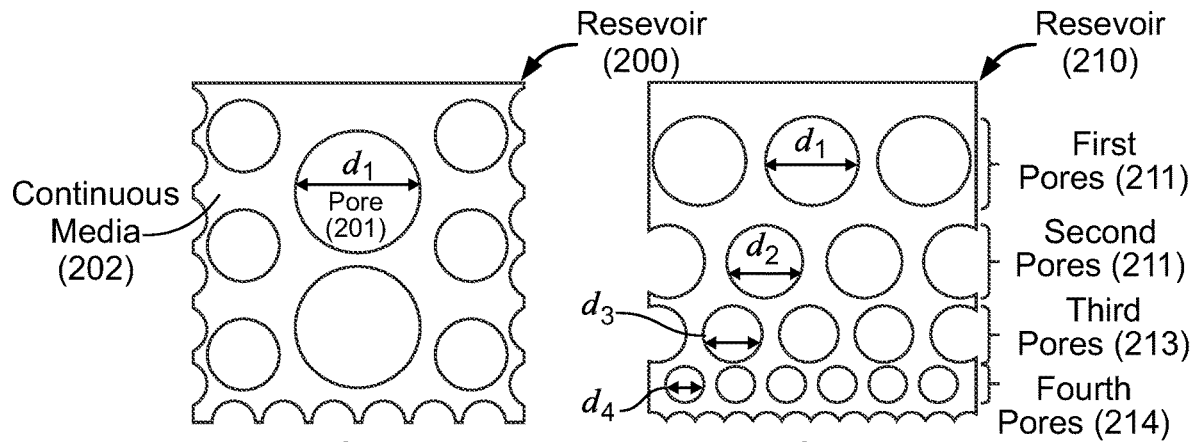
FIG. 2A-2B shows exemplary porous reservoirs. Provided are schematics of (A) an exemplary porous reservoir 200 having a plurality of first pores 201 and (B) another exemplary porous reservoir 210 having a plurality of first pores 211, a plurality of second pores 212, a plurality of third pores 213, and a plurality of fourth pores 214.

The reservoir for a stamp can be structured in any useful manner. In one non-limiting embodiment, the reservoir is a porous reservoir having a plurality of pores. The pores of the reservoir can be configured to be in fluidic communication with the printing elements, such that ink can be metered between the reservoir and the printing elements. As seen in FIG. 2A, the reservoir 200 can include a plurality of pores 201 disposed within a continuous media 202. The characteristic of pores can be designed to provide any useful fluidic transfer or flow through the reservoir and out of the reservoir. Such characteristics can include size of the pore(s) (e.g., a diameter of the pore), the pore volume (e.g., a ratio of the void volume to the total volume of the reservoir), the distribution of pores (e.g., the abundance of each pore size in a volume of the reservoir; or the spatial arrangement of pores within the reservoir), shape of the pores (e.g., cylindrical, spherical, ovoid, etc.), etc. FIG. 2B shows an exemplary reservoir 210 having pores with differing characteristics, such as a plurality of first pores 211 having a first diameter $d_1$, a plurality of second pores 212 having a second diameter $d_2$, a plurality of third pores 213 having a third diameter $d_3$, and a plurality of fourth pores 214 having a fourth diameter $d_4$. The first, second, third, and fourth pores can be arranged in any useful manner, such as in a manner to draw ink towards the contact surface of the reservoir. Alternatively, pores can be arranged to wick ink into the reservoir, thereby providing a pool of ink that can be metered by applying the ink transfer component to the substrate. Additional structural configurations for printing cells, printing elements, and reservoirs are described herein.

Printing Elements, Including Printing Cells

An ink transfer component can include a plurality of printing elements, and each printing element can include one or more compressible structures that provide beneficial transfer of a printing fluid (e.g., an ink) from the reservoir to the ink transfer component. In some embodiments, the compressible structure is a printing cell. Such printing elements and printing cells can have any useful structural characteristic, e.g., possession of a negative Poisson's ratio.

The plurality of printing elements can be arrayed to provide any useful pattern. In one embodiment, the pattern is characterized by a spacing s between two or more printing elements. Furthermore, to stabilize the ink transfer component, one or more external struts can be present between two or more printing elements. Optionally, one or more internal struts can be present within a printing cell. The pattern, itself, can impart a negative Poisson's ratio to the ink transfer component as a whole. In particular embodiments, the pattern can include a framework including unit cells and one or more external struts (e.g., one or more external flexible struts, wavy struts, curved struts, etc.).

In particular embodiments, each printing cell has a negative Poisson's ratio. A printing cell can include one or more struts, including one or more internal struts within a printing cell; or including one or more external struts between two or more printing cells.

The printing cell can have any useful geometry. In some embodiments, the printing cell is a re-entrant honeycomb cell optionally including one or more bendable struts within a cell and/or between two or more cells; a re-entrant triangular cell; a re-entrant star-shaped cell; a structurally hexagonal re-entrant honeycomb; a hexagonal honey including one or more internal/external struts (e.g., any described herein); a chiral honeycomb; a hinged cell; a tilting square; a tilting polygon; a rotating polygon; a chiral circular cell; a rotachiral cell; a Bucklicrystal; a cut missing-rib cell; a non-convex, star-shaped cell, etc. In particular embodiments, the printing cell is a microcell. Furthermore, any printing cell can include one or more internal struts. In addition, two or more printing cells can include one or more external struts connecting the cells.

The printing cell (or unit cell) can include any useful features to accommodate displacement of the cell walls along a particular direction. Furthermore, the walls of the printing cell can define any useful inner volume. In one instance, the cell walls are directed to a hexagon, honeycomb topology, in which six cell walls are employed to define hexagonal inner volume. In another instance, the cell walls are directed to a re-entrant honeycomb topology, in which six cell walls are employed to define an hour-glass shaped, hexagonal inner volume. Other topologies include chiral honeycomb, star-shaped, and double arrowhead topologies. Further topologies are described in Alderson A et al., "Auxetic materials," *Proc. IMechE* 2007; 221(Part G):565-75, which is incorporated herein by reference in its entirety.

Additional exemplary printing cells are described in Adler L et al., "The effect of a negative Poisson's ratio on thermal stresses in cellular metallic structures," *Smart Mater. Struct.* 2016; 25:115038 (9 pp.); Babaee S et al., "3D soft metamaterials with negative Poisson's ratio," *Adv. Mater.* 2013; 25:5044-9; Bowick M et al., "Universal negative Poisson ratio of self-avoiding fixed-connectivity membranes," *Phys. Rev. Lett.* 2001; 87:148103 (4 pp.); Caddock B D et al., "Microporous materials with negative Poisson's ratios: I. microstructure and mechanical properties" *J. Phys. D. Appl. Phys.* 1989; 22:1877-82; Clausen A et al., "Topology optimized architectures with programmable Poisson's ratio over large deformations," *Adv. Mater.* 2015; 27:5523-7; Fozdar D Y et al., "Three-dimensional polymer constructs exhibiting a tunable negative Poisson's ratio," *Adv. Functional Mater.* 2011; 21:2712-20; Gao Z et al., "Two-dimensional mechanical metamaterials with unusual Poisson ratio behavior," *Phys. Rev. Appl.* 2018; 10:064039 (8 pp.); Greaves G N et al., "Poisson's ratio and modern materials," *Nature Mater.* 2011; 10:823-37; Lakes R, "Advances in negative Poisson's ratio materials," *Adv. Mater.* 1993; 5:293-6; Lakes R, "Deformation mechanisms in negative Poisson's ratio materials: structural aspects," *J. Mater. Sci.* 1991; 26:2287-92; Lakes R, "Materials with structural hierarchy," *Nature* 1993; 361:511-5; Lakes R et al., "Negative compressibility, negative Poisson's ratio, and stability," *Phys. Status Solidi B* 2008; 245:545-51; Larsen U D et al., "Design and fabrication of compliant micromechanisms and structures with negative Poisson's ratio," *J. Microelectromech. Sys.* 1997; 6:99-106; Novikov V V et al., "Negative Poisson coefficient of fractal structures," *Phys. Solid State* 1999; 41:1970-5; Pikhitsa P V, "Architecture of cylinders with implications for materials with negative Poisson ratio," *Phys. Status Solidi B* 2007; 244:1004-7; Prall D et al., "Properties of a chiral honeycomb with a Poisson's ratio of −1," *Int. J. Mech. Sci.* 1997; 39:305-14; Prawoto Y, "Seeing auxetic materials from the mechanics point of view: a structural review on the negative Poisson's ratio," *Comput. Mater. Sci.* 2012; 58:140-53; Qin D et al., "Rapid prototyping of complex structures with feature sizes larger than 20 µm," *Adv. Mater.* 1996; 8:917-9; Saxena K K et al., "Three decades of auxetic research-materials with negative Poisson's ratio: a review," *Adv. Eng. Mater.* 2016; 18:1847-70; Scarpa F et al., "On the transverse shear modulus of negative Poisson's ratio honeycomb structures," *Fatigue Fracture Eng. Mater. Struct.* 2000; 23:717-20; Sigmund O, "Tailoring materials with prescribed elastic properties," *Mech. Mater.* 1995; 20:351-68; Theocaris P S et al., "Negative Poisson's ratios in composites with star-shaped inclusions: a numerical homogenization approach," *Arch. Appl. Mech.* 1997; 67:274-86; Wan H et al., "A study of negative Poisson's ratios in auxetic honeycombs based on a large deflection mode," *Eur. J. Mech. A Solids* 2004; 23:95-106; Wojciechowski K W, "Two-dimensional isotropic system with a negative Poisson ratio," *Phys. Rev. Lett.* 1989; 137:60-4; Xu B et al., "Making negative Poisson's ratio microstructures by soft lithography," *Adv. Mater.* 1999; 11:1186-9; Yang L et al., "Mechanical properties of 3D re-entrant honeycomb auxetic structures realized via additive manufacturing," *Int. J. Solids Struct.* 2015; 69-70:475-90; and Zhu H X et al., "Composite materials with enhanced dimensionless Young's modulus and desired Poisson's ratio," *Sci. Rep.* 2015; 5:14103 (8 pp.), as well as U.S. Pat. Pub. No. 2006-0180505, each which is incorporated herein by reference in its entirety.

Methods of Printing

The present invention also relates to use of an architected stamp (e.g., any herein) to print any useful pattern. For instance, the architected stamp can include an ink transfer component having the desired pattern to be printed, in which a plurality of printing elements are disposed within that pattern. Exemplary methods for printing can include providing an architected stamp having the desired pattern, applying an ink to the stamp (e.g., a distal portion of the stamp or the ink transfer component), and contacting the stamp to a substrate.

An ink can be applied to a distal portion of the stamp, such as to an ink transfer component disposed at the distal portion of the stamp. In some instances, during the applying step, the ink is delivered to one or more pores or voids present within the stamp. In particular instances, the pores or voids are present within the ink transfer component. Pores or voids can be structurally designed into a printing element (e.g., by using a printing cell having a void) and/or by including a spacing between printing elements. In yet other instances, pores or voids are present within the porous reservoir, and ink is delivered to the pores within the porous reservoir. Any useful ink may be employed. In one embodiment, the ink is a conductive ink (e.g., including a plurality of conductive particles, such as conductive nanoparticles).

Transfer of the ink can be accomplished by contacting a distal portion of the ink transfer component to the substrate. Such a contacting step can withdraw ink from the stamp to the substrate, such as by transferring ink from a pore (e.g., within a porous reservoir or a porous ink transfer component) to the substrate. In some embodiments, the ink is transferred from the plurality of pores of the porous reservoir to the plurality of printing elements and then to the substrate. In other embodiments, the ink is transferred from the plurality of printing elements to the substrate.

Whereas the contacting step compresses the ink transfer component (or a printing element within this component), lifting away the stamp can act to decompress the ink transfer component. In particular embodiments, the ink transfer component or the printing element has a negative Poisson's ratio, such that the steps of contacting and lifting act to meter the ink to the substrate's surface.

The printing method can include one or more other useful steps. In one embodiment, the method includes treating the stamp (e.g., prior to applying the ink) to provide a hydrophilic surface for the ink transfer component. In another embodiment, the method includes priming the stamp (e.g., prior to the contacting the ink transfer component to the substrate) to remove excess ink on the distal surface of the stamp. Such a priming step can include contacting a distal portion of the ink transfer component to a first substrate (e.g., a test substrate), thereby removing an excess of the ink from the plurality of printing elements and providing a primed ink transfer component. Then, the method can further include contacting a distal portion of the primed ink transfer component to a second substrate, thereby transferring the ink from the plurality of printing elements to the second substrate.

Methods of Fabricating Stamps

The architected stamps herein can be fabricated in any useful manner. In one embodiment, the method includes additive manufacturing to fabricate an architected stamp (e.g., any described herein). Exemplary manufacturing methodologies include additive manufacturing techniques, multiphoton lithography (MPL), 3D laser lithography, electron beam lithography (EBL), direct laser writing (DLW), direct laser lithography, photolithography, near-field optical lithography, nanoimprint lithography (NIL), deep UV lithography (DUV), extreme UV lithography (EUV), multiphoton polymerization (MPP) lithography, dip pen lithography (DPL), scanning tunneling microscopy lithography, atomic force microscopy lithography, microstereolithography, molecular beam epitaxy (MBE), ink jet printing, electrohydrodynamic (EHD) jet printing, focused-ion-beam (FIB) milling, and deposition techniques (e.g., any described herein).

Such methods can employ any different types and combinations of materials. Exemplary materials include a photoresist, a polymer (e.g., an acrylate, a methacrylate, etc.), etc., which can include one or more other useful components, such as a stabilizer, a filler (e.g., particles, silica, etc.), a particle (e.g., a nanoparticle or a microparticle), a nanostructure (e.g., a nanoparticle or a nanotube, such as a carbon nanotube), a photoinitiator, a salt (e.g., a metallic salt), etc. After fabrication, the stamps can be further treated, e.g., by use of an agent (e.g., ozone, ethylene glycol, polyethylene glycol, silane, etc.) to provide a hydrophilic surface.

The stamps (including metamaterials and/or printing cells) can be formed from any useful material. Exemplary materials include optically clear materials (e.g., a glass, a photoresin, a polymer, etc.), opaque substrates (e.g., silicon, carbon fiber, etc.), metals (e.g., copper, silver, nickel, gold, titanium, aluminum, steel, etc.), conductive materials (e.g., including one or more metals), oxides (e.g., metal oxides, such as alumina; silica), ceramics (e.g., silicates), plastics (e.g., a thermoplastic, polyethylene, polypropylene, polyester, nylon, etc.), polymers, glasses (e.g., chalcogenide glass, glassy carbon, or a metallic glass), as well as combinations thereof (e.g., a metal-polymer composite, or a ceramic-polymer composited) and any described herein. Further materials are described in Bauer J et al., "Nanolattices: an emerging class of mechanical metamaterials," *Adv. Mater.* 2017; 29: Art. 1701850 (26 pp.) and U.S. Pat. No. 7,963,085, which is incorporated herein by reference in its entirety.

Exemplary photoresins can include any useful two-photon polymerization (2PP) optimized materials or UV-photocurable photoresists, including and without limitation, an epoxy-based photoresist (e.g., SU-8, an epoxy-based bisphenol A novolac photoresist), an acrylate-based photoresist (e.g., an organically modified ceramic, such as Ormocer® or OrmoComp® from micro resist technology GmbH, Berlin, Germany), the IP series of UV-curable photoresists developed by Nanoscribe GmbH, Eggenstein-Leopolds-hafen, Germany (e.g., IP-Dip, IP-L 780, IP-G 780, and IP-S photoresists), the AZ® series of photoresists available from Microchemicals GmbH, Ulm, Germany (e.g., AZ® 9200 series of positive photoresists, such as AZ® 9260 and AZ® 9245; the AZ® series of chemically amplified, positive photoresists, such as AZ® 12 XT and AZ® 40XT; AZ® MiR™ series of positive photoresists, such as AZ® MiR™ 701 14CP and AZ® MiR™ 701 29 CP; and AZ® 5200 series of image reversal, lift-off photoresists, such as AZ® 5209E and AZ® 5214E), acrylic-based photopolymer (e.g., Full-Cure® materials, such as the FullCure® Vero series (8XX series, such as FullCure® 850), the FullCure® General Purpose series (7XX series, such as FullCure®720), the FullCure® Durus series (e.g., FullCure®430), and the FullCure® Tango series (9XX series, such as FullCure®930)), etc.

Yet additional materials include a polymer (e.g., thermoplastic polymer), such as polymethyl methacrylate (PMMA), polyethylene terephthalate (PET, e.g., biaxially-oriented PET or bo-PET), an acrylic polymer, poly(dimethylsiloxane) (PDMS), polycarbonate (PC), polyamide (PA), polysulfone (PSU), cyclo-olefin copolymer (COC), polyethylene terephthalate glycol (PETG), polyethylene (PE, such as branched homo-polymer PE), polyetheretherketone (PEEK), polyvinylchloride (PVC), polystyrene (PS), styrene copolymer, polyimide (PI), polypropylene (PP), polytetrafluoroethylene (PTFE), perfluoroalkoxy copolymer (PFA), polyvinylidinefluoride (PVDF), polynorbornene (PN), polyoxymethylene (POM), poly(4-methyl-1-pentene), silicone, and combinations or co-polymers thereof. Polymers can include any useful additive, such as, e.g., fillers (e.g., mica, talc, or calcium carbonate), plasticizers (e.g., dioctyl phthalate), heat stabilizers (e.g., organo-tin compounds), antioxidants (e.g., phenols or amines), and/or UV stabilizers (e.g., benzophenones or salicylates). Such materials can be provided in any useful form, such as in one or more layers that can be optionally laminated.

Further steps can be employed to provide any useful material. In one non-limiting instance, photocurable photoresists can be employed to form a microtemplate, and other materials may be deposited on that template. Exemplary deposition techniques include electroplating, electroless plating, electrodeposition, chemical vapor deposition (CVD, including laser assisted CVD), atomic layer deposition (ALD), localized electrochemical deposition (LECD), electron-beam evaporation, galvanization, casting, metal infiltration, laser-induced forward transfer (LIFT), etc., of any useful material (e.g., a polymer, a metal, a metal oxide, a glass, including alloys and combinations thereof). Additional methodologies and materials are described in Hirt L et al., "Additive manufacturing of metal structures at the micrometer scale," *Adv. Mater.* 2017; 29: Art. 1604211 (30 pp.), which is incorporated herein by reference in its entirety.

Composite structures can have a metamaterial disposed between any useful sandwich layer. Exemplary materials can include a backing material (e.g., a polymer layer, a metal layer, ceramic layer, or any other layer of a material described herein), an adhesive material, or combinations thereof. Exemplary composite structures include sandwich panel construction materials. Exemplary adhesive materials include an acrylate (e.g., a silicone acrylate, a polymethyl acrylate, a polymethyl methacrylate, including those formed from 2-ethyl hexyl acrylate or n-butyl acrylate monomers, etc., such as any having a melting temperature of about 160° C.), a polyolefin (e.g., polyethylene, polybutene, or polypropylene), an acetate (e.g., an ethylene-vinyl acetate having a melting temperature of about 110° C.), a styrene (e.g., a polystyrene, a styrene block copolymer (e.g., styrene-butadiene-styrene, styrene-isoprene-styrene, styrene-ethylene/butylene-styrene, or styrene-ethylene/propylene), an isobutylene (e.g., polyisobutylene, a copolymer of isobutylene with isoprene, including copolymers thereof, as well as any having a melting temperature of about 100° C.), a rubber (e.g., a polyisoprene, a silicone rubber, a polychloroprene, a polyisobutylene, as well as copolymers of any of these), a polyamide, a polyester, a polyurethane, a polynitrile (e.g., nitrile butadiene rubber), a polyether (e.g., a vinyl ether), etc. The adhesive material can be provided in any useful format. For instance, the adhesive material can be provided as a substantially planar substrate.

EXAMPLES

Example 1: Architected Porous Stamps for Liquid Transfer Printing

The present invention, in part, relates to materials and processes for generation, iteration, and optimization of porous media with user-defined dynamic mechanical properties to be used for transfer printing (e.g., high speed roll-to-roll technique of flexography). Such porous media can be provided as a stamp having a porous reservoir, as well as a porous stamp having an ink transfer component having pores or voids defined by the plurality of printing elements. For example, a printing element can include one or more unit cells having structural elements (e.g., struts, walls, joints, etc.) and empty space, which together provide a structure having a negative Poisson's ratio.

Such stamps can be used, e.g., for printed electronics, which have attracted significant interest in recent years for widespread applications in energy conversion and storage, flexible displays, environmental and chemical sensing, biomedical devices, and hybrid microelectronics platforms (see, e.g., Fukuda K et al., "Recent progress in the development of printed thin-film transistors and circuits with high-resolution printing technology," *Adv. Mater.* 2017; 29:1602736 (22 pp.); Krebs F C et al., "Product integration of compact roll-to-roll processed polymer solar cell modules: methods and manufacture using flexographic printing, slot-die coating and rotary screen printing," *J. Mater. Chem.* 2010; 20:8994-9001; Lupo D et al., "Chapter 1: OE-A Roadmap for Organic and Printed Electronics," *In Applications of Organic and Printed Electronics: A Technology-Enabled Revolution*, Cantatore E (ed.), Springer Science+Business Media (Boston, Mass.), 2013, pp. 1-26; and Sarobol P et al., "Additive manufacturing of hybrid circuits," *Annual Rev. Mater. Res.* 2016; 46:41-62). This field is built on the integration of functional materials with advanced printing technologies, many adapted from traditional graphic arts and letterpress applications.

In particular, mass production printing processes are currently being re-examined to determine their suitability for the emerging area of printed electronics, specifically, roll-to-roll processes. For high-throughput manufacturing, roll-to-roll fabrication methods such as gravure, offset, and flexographic printing offer significant benefits in process speed and economics (see, e.g., Khan S et al., "Technologies for printing sensors and electronics over large flexible substrates: a review," *IEEE Sensors J.* 2015; 15(6):3164-85). These processes predominantly rely on high speed ink-transfer mechanisms using direct contact between the print-form (or stamp) to the substrate.

Flexography, in particular, is conceptually straightforward: a stamp with raised features is inked via contact with an anilox roll containing engraved wells, and the stamp is then contacted to the target substrate to transfer the ink in the pre-defined pattern (see, e.g., Kattumenu R C, "Flexography printing of silver based conductive inks on packaging substrates," *Ph.D. dissertation, Department of Paper Engineering, Chemical Engineering, and Imaging, Western Michigan University*, 2008, 156 pp; Deganello D et al., "Impact of metered ink volume on reel-to-reel flexographic printed conductive networks for enhanced thin film conductivity," *Thin Solid Films* 2012; 520(6):2233-7; and Moonen P F et al., "Fabrication of transistors on flexible substrates: from mass-printing to high-resolution alternative lithography strategies," *Adv. Mater.* 2012; 24(41):5526-41). The resulting combination of high throughput fabrication and moderate resolution is compelling for applications such as solar cell metallization and printed circuits, but improvements in resolution could enhance the viability of this method for more widespread use (see, e.g., Frey M et al., "Front-side metalization by means of flexographic printing," *Energy Procedia* 2011; 8:581-6; Leppaniemi J et al., "Flexography-printed $In_2O_3$ semiconductor layers for high-mobility thin-film transistors on flexible plastic substrate," *Adv. Mater.* 2015; 27:7168-75; and Lorenz A et al., "Evaluation of flexographic printing technology for multi-busbar solar cells," *Energy Procedia* 2015; 67:126-37).

While traditional stamps are based on solid elastomers, recent work reveals promise for advancing flexography with more sophisticated stamp designs. Using a nanoporous stamp fabricated from carbon nanotube forests, Kim et al. demonstrated precision patterning of thin films for electronics, achieving sub-100 nm film thickness and sub-5 µm feature size with high fidelity (see, e.g., Kim S et al., "Ultrathin high-resolution flexographic printing using nanoporous stamps," *Sci. Adv.* 2016; 2(12):e1601660 (12 pp.)).

Mariappan et al. expanded on this work, examining the basic mechanisms of fluid transfer for these nanoporous stamps (see, e.g., Mariappan D D et al., "Dynamics of liquid transfer from nanoporous stamps in high-resolution flexographic printing," *Langmuir* 2019; 35:7659-71). To generalize and explore this capability, advanced micro-scale additive manufacturing can be leveraged to precisely define flexographic stamps, offering unprecedented control of stamp microstructure to engineer fluid transfer properties.

Multiphoton lithography (MPL) provides a versatile platform to fabricate flexographic stamps with microstructural control. MPL employs specialized photoresists and advanced optics to drive spatially confined polymerization with three-dimensional (3D) control, achieving sub-micron feature sizes (see, e.g., LaFratta C N et al., "Multiphoton fabrication," *Angew. Chem. Int'l Ed. Engl.* 2007; 46(33): 6238-58; and Maruo S et al., "Recent progress in multiphoton microfabrication," *Laser Photonics Rev.* 2008; 2:100-11). As a digital technique, this process offers rapid prototyping capability to replicate a concept, defined in a computer-aided design (CAD) model, in real space, motivating recent applications such as optics, bioengineering, and mechanical metamaterials (see, e.g., Bückmann T et al., "Tailored 3D mechanical metamaterials made by dip-in direct-laser-writing optical lithography," *Adv. Mater.* 2012; 24:2710-4; Kuebler S M et al., "Fabrication of functional nanophotonic devices by multiphoton lithography," *Proc. SPIE* 2019; 10915:1091502 (11 pp.); Montemayor L C et al., "Design and fabrication of hollow rigid nanolattices via two-photon lithography," *Adv. Eng. Mater.* 2014; 16(2):184-9; Sun Y L et al., "Aqueous multiphoton lithography with multifunctional silk-centered bio-resists," *Nature Commun.* 2015; 6:8612 (10 pp.); and Weiß T et al., "Two-photon polymerization for microfabrication of three-dimensional scaffolds for tissue engineering application," *Eng. Life Sci.* 2009; 9:384-90).

As an example of the invention, MPL was applied to flexographic stamp fabrication to precisely tailor capillarity and deformation mechanics through structure, achieving ink transfer with exceptional control for printed electronics applications. The flexography technique (flexo), which uses inked relief structures (e.g., rubber stamps), can be used for pattern printing. To address many of the defects that plague the flexo process to print microscale features (e.g., as for printed circuits), it was considered how an engineered porous stamp could increase print fidelity and film uniformity for the "rubber stamp" approach of flexography. Without wishing to be limited by theory, it was hypothesized that architected stamps saturated with ink could deliver metered deposition to a substrate via a mechanical metamaterial response (e.g., negative Poisson's ratio) during compression. Using an ultra-high resolution 3D printing technique, it was shown that porous stamps with microscale features can outperform traditional solid stamps.

In one non-limiting embodiment, fiber-based porous stamps consistently delivered thinner and more uniform films versus solid counterparts. Investigations using compression-enabled mechanical structures (metamaterials) led to consideration of the greater effects of liftoff versus contact during printing. With this knowledge in hand, stamps were designed to dictate the competing forces (e.g., capillary pressure in the stamp versus contact meniscus) resulting in significant control over fluid transfer by varying the pore structure (e.g., pore sizes, pore distribution, pore gradient, etc.). Overall, the framework, process flow, and iteration/optimization to prescribe the fluid mechanics for high speed printing were developed, thereby enabling advanced flexographic transfer processes using free-form microfabrication of porous media. Additional details are provided herein.

Example 2: Digitally Designed Porous Media to Control Capillary Imbibition and Release Under Mechanical Deformation The development of printed and unconventional electronic devices to meet application-specific needs requires innovation in printing technologies. Modern flexography (flexo), a roll-to-roll compatible rubber-stamping method developed and matured in the 19th and 20th centuries, has proven scalable (meters per second) for graphic arts. The flexo process has advantages over other printing methods, such as fast turnaround and low cost fabrication of print forms versus, for example, gravure and has thus been widely adopted by the printing industry. However, it is currently underdeveloped for printed electronics, particularly transistor and transparent electrode applications, due to limited feature resolution (100-50 μm). Although work has gone into understanding the structural and fluid mechanics of the ink transfer processes, little attention has been paid to the mechanical properties of the physical stamp, which is typically fabricated as a solid, elastomeric polymer using replication of a hard master, photopolymer development of print forms, or subtractive etching of block stamps.

During printing, an elastomeric stamp is generally topside inked (from a grooved, ink saturated roller called the anilox) and compressed on a substrate. This process has inherent limits for material transfer and is known to incur various defects due to the compression-induced spreading using solid stamps, which include haloing (ink extends beyond edges), feathering (uneven edges), skip out (missing areas of ink transfer), filling in (excess ink issue), bridging (coalescence of distinct printed patterns), and pinholing (small holes in solid areas).

Despite the widespread use of flexo and the increasing interest in printed electronics, few studies have looked to improve the quality of prints through new techniques or materials. However, a recent study from MIT provides a welcome exception, which study investigated the use of forests of carbon nanotubes (CNT). Forms were generated by patterning the catalyst for subsequent CNT growth, followed by surface functionalization to increase wettability (see, e.g., Kim S et al., "Ultrathin high-resolution flexographic printing using nanoporous stamps," *Sci. Adv.* 2016; 2(12):e1601660 (12 pp.)). The result was a liquid-imbibing matrix for ink infiltration and uniform film delivery. However, the synthesis of these print forms required multiple (complex and specialized) steps of lithography, chemical vapor deposition (CVD), etching and other post processing, and offers limited opportunity to directly engineer the microstructure.

Thus, the invention builds upon these ideas using concepts from field of mechanical metamaterials (see, e.g., Bertoldi K et al., "Flexible mechanical metamaterials," *Nature Rev. Mater.* 2017; 2(11):17066 (11 pp.)), in which properties are defined by structuring rather than bulk composition. For example, consider a porous stamp that displays negative Poisson's ratio (NPR) applied to this process. Here, ink transfer could be a metered process with the pore-space being the reservoir and the mechanical deformation being the "metering pump". Moreover, a stamp that exhibits a slight NPR allows for controlled expulsion and sharper transfer foot print (minimal line-edge roughness). Only recently has it been feasible to produce such engineered structures at high resolution using a three-dimensional (3D)

print process termed multiphoton lithography (<1 micron feature size). Specifically, according to the present invention, precisely architected (e.g. NPR and a structured pore size distribution), 3D porous media can control the fluid saturation/capillary pressure characteristics upon mechanical compression that enables high fidelity/metered material transfer for high speed printing.

As described herein, the ability to structure porous media with micron resolution for the flexo process was examined. The suitability of 3D printed materials for ink transfer was determined, the defined mechanical compression on transfer fidelity and uniformity was evaluated, and how capillary pressure in porous stamps can affect liquid transfer during contact and particularly during lift off was considered. Finally, the ability to meter ink deposition using porous gradients was demonstrated. Modeling informed the fluid mechanics of ink transfer using architected porous media.

Example 3: Experimental Methods

Fabrication of stamps: Multiphoton lithography (MPL; also referred to as Direct Laser Writing, Two Photon Polymerization) is a laser-based, 3D printing technique that currently provides the finest feature resolution amongst all 3D printing modalities by taking advantage of non-linear molecular excitations that occur under intense photon flux (see, e.g., 3. Barner-Kowollik C et al., "3D laser micro- and nanoprinting: challenges for chemistry," *Angew. Chemie Int'l Ed. Engl.* 2017; 56(50):15828-45; Kaehr B et al., "Mask-directed multiphoton lithography," *J. Am. Chem. Soc.* 2007; 129(7):1904-5; and Nielson R et al., "Microreplication and design of biological architectures using dynamic-mask multiphoton lithography," *Small* 2009; 5(1): 120-5).

In practice, a short pulsed, near-infrared (NIR, e.g., 800 nm) laser beam is focused into a photosensitive solution, where two-photon absorption processes (e.g., 400 nm excitation of a photosensitizer) are restricted to the focal point of the laser. The reaction volume (voxel) can be translated in XYZ providing truly intrinsic 3D printing. Assuming a Gaussian beam profile, the two-photon threshold can be tuned to sub-diffraction limited space, allowing feature sizes on the order of 100 nm without using specialized optics or other super-resolution techniques.

For these experiments, a commercial MPL system from the German company Nanoscribe GmbH (Eggenstein-Leopoldshafen, Germany) was used. Built onto an inverted Zeiss microscope platform, the fully contained system uses an Erbium fiber laser with 180 mW maximum average power output at 780 nm. This system takes advantage of an XY motorized stage to cover a 10×10 cm area, a three-axis piezo-stage with 300 $\mu m^3$ of movement, and galvo-driven mirror scanning providing scan speeds of up to 180,000 $\mu m$/sec. This allows relatively large structures (e.g., 3 $mm^3$ lattices) to be fabricated in a matter of hours using a "shell and scaffold" approach (versus many days if only using piezo).

For all experiments, a 25× focusing objective and IP-S Photoresist, which is a proprietary UV-curable photoresist (available from Nanoscribe GmbH) that is index-matched medium-resolution for faster laser writing were used. The objective is dipped into the resist to fabricate tall structures. Structures to be fabricated were designed in SolidWorks and imported as a binary STL file into DeScribe (Nanoscribe slicing software). Following printing, lattices were developed in propylene glycol monomethyl ether acetate (PG-MEA) for 25-30 minutes and subsequently rinsed in methoxy-nonafluorobutane (Novec™ 7100) or isopropyl alcohol.

Figure 3A:
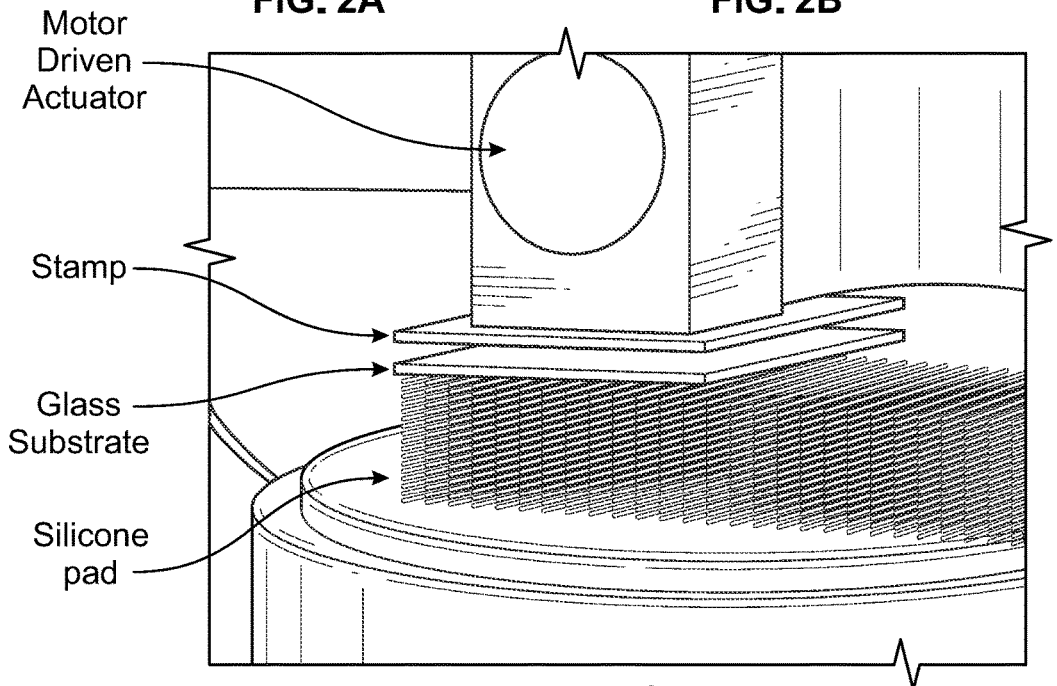
FIG. 3A-3B shows photographs of (A) an exemplary setup for ink transfer and (B) another exemplary setup for ink transfer.
Figure 3B:
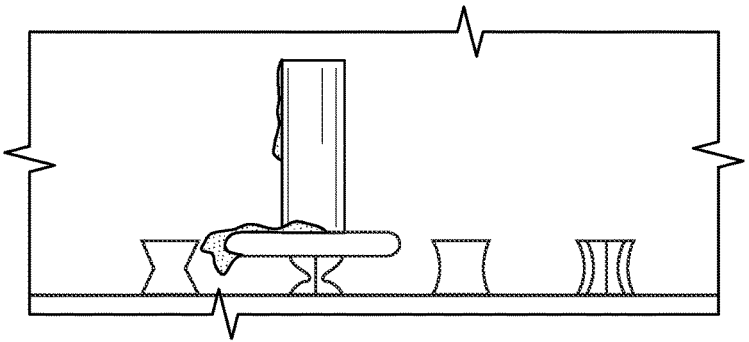

Ink transfer: Silver nanoink (50-60 wt. % solids in tetradecane, particle size ≤10 nm; Sigma Aldrich Corp., St. Louis, Mo., catalog no. 736511) was used for all experiments. Print forms were inked via spin-coating at 3000 rpm for 30 seconds and used immediately for printing. Printing was performed using a servo motor operating at a speed of 200 $\mu m$/sec with a hard stop within ±5 $\mu m$ of surface to surface contact. The print form was backed with a silicone compression pad and contacted with a glass substrate (FIG. 3A). In some instances, solid blocks were printed to physically limit compression to 5 microns of the porous stamp. The stamps were treated with $O_2$ plasma (Plasma Etch PE-75 Venus Plasma Asher; 5 SCCM flow rate for 1 min in a 0.1 Torr vacuum chamber and 100 W RF power), prior to inking to increase wettability.

Typically, the form was printed multiple times for a single inking, and data taken from the third or fourth transfers. Following ink transfer, the print was either dried under ambient conditions overnight or at 50° C. for 10 minutes in a vacuum oven. The printed area was imaged and measured using a Keyence VHX microscope and compared to the expected print area. Thickness of the dried film was measured using profilometry (Veeco Dektak 150).

Example 4: Characterization of Fiber-Based Printing Elements

Elastomers typically used for flexo print forms display relatively low stiffness. For example, polydimethylsiloxane (PDMS)—widely used in microcontact printing—exhibits a Young' modulus of ~1-2 MPa (see, e.g., Johnston I D et al., "Mechanical characterization of bulk Sylgard 184 for microfluidics and microengineering," *J. Micromech. Microeng.* 2014; 24(3):035017 (7 pp.)), whereas fully cured IP-S resist exhibits an elastic modulus (Young's modulus of about 4.6 GPa. This rigidity enables printing of mechanically stable, high aspect ratio structure's with ~1 micron feature sizes.

Figure 4A:
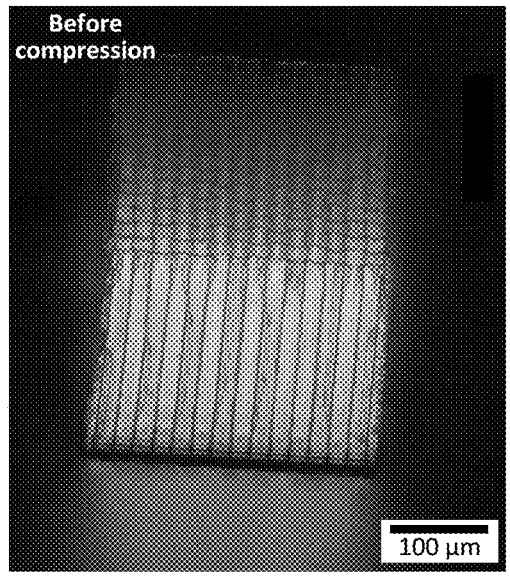
FIG. 4A-4D shows results for simple stamp structures. Provided are (A,B) images of a stamp having simple vertical channel structures either (A) before compression and (B) after compression. Also provided are images of (C) an inked stamp having simple horizontal and vertical channel structures and (D) the resultant transferred silver ink upon a substrate.
Figure 4B:
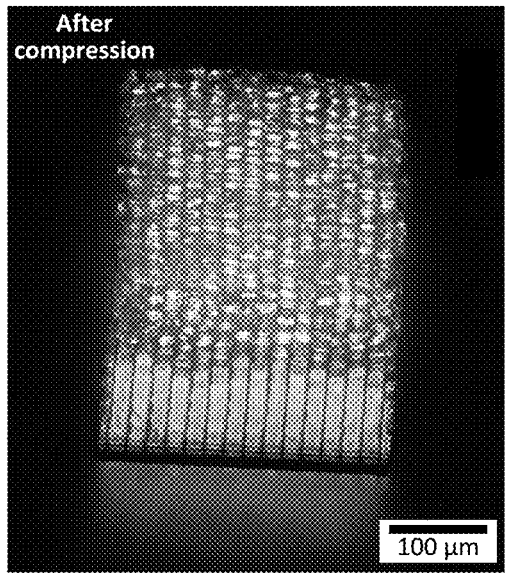
Figure 4C:
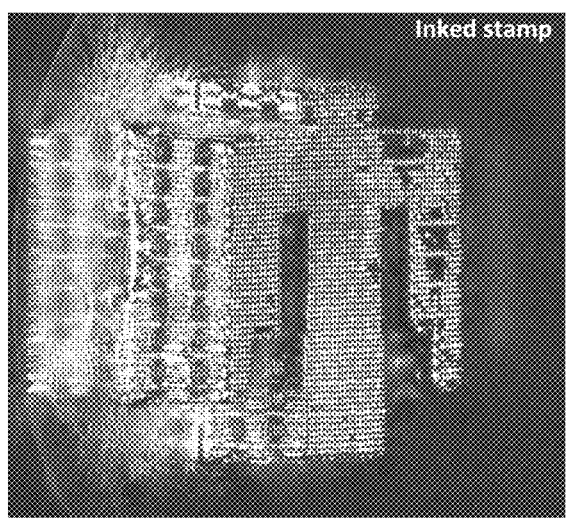
Figure 4D:
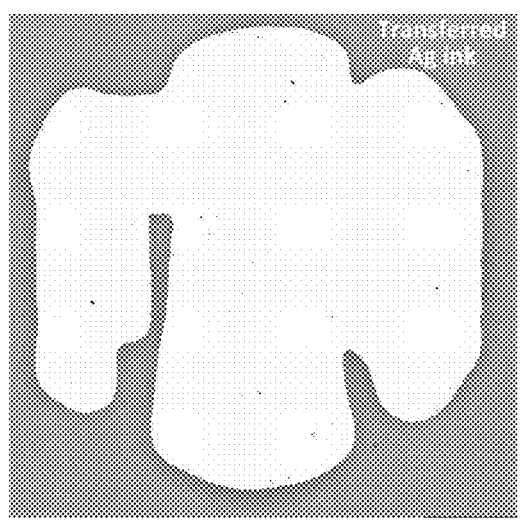

Initial studies included stamps having simple channel porous structures as the printing elements (FIGS. 4A-4D). As can be seen, compression of such simple channels resulted in structural damage (FIGS. 4A-4B) and provided inaccurate ink transfer (FIGS. 4C-4D).

Figure 5A:
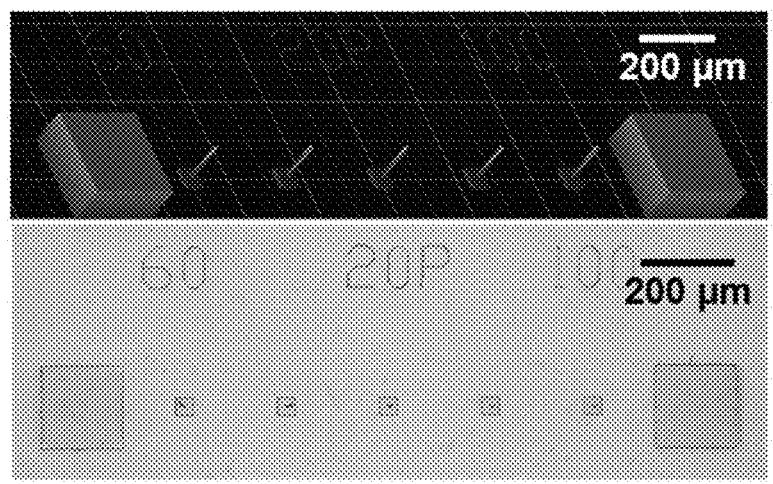
FIG. 5A-5C shows results with a fiber-based printing element. Provided are (A) a schematic showing test design to understand compression characteristics of individual fibers formed by multiphoton lithography (MPL); (B) a schematic of experimental setup for fabrication single 5 µm diameter fibers sprouting from solid blocks of cured resist, in which laser power was increased from 60% to 100%; and (C) images showing fibers fabricated with varying laser power (60%, 70%, or 90%), in which fibers are shown as printed or after compression.
Figure 5B:
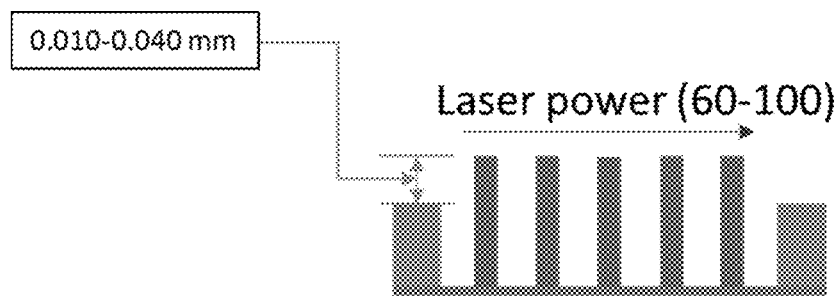
Figure 5C:
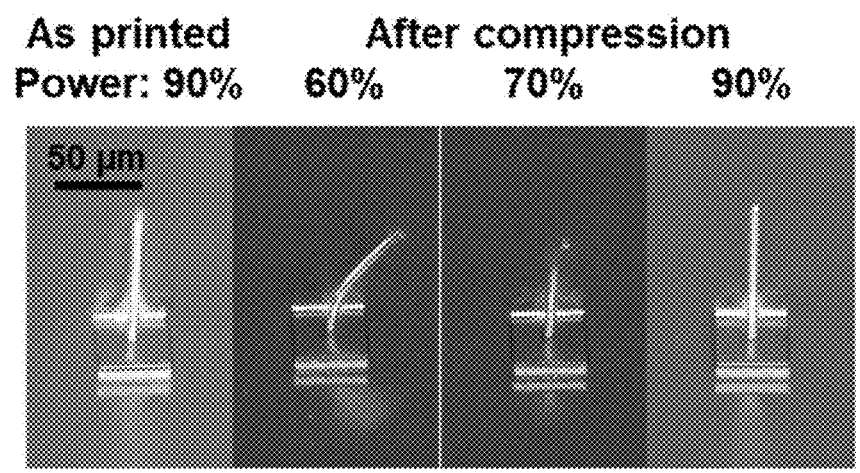

In another direction to developing porous stamps, simple fiber structures were used as printing elements. After some preliminary work, a minimum fiber diameter of 5 $\mu m$ (100 $\mu m$ tall; aspect ratio=50) was chosen and a compression versus laser power experiment was done to determine the elasticity of the IP-S fibers. Higher laser power increased the crosslinking/density of the material up to a point, beyond which the resist can overheat and generate microexplosions. FIG. 5A-5C shows the experimental setup (FIGS. 5A-5B) and takeaway results (FIG. 5C) of the study. It was found that at and above 90% laser power, the fibers behaved elastically following up to 40% compression. Below an input laser energy of 90%, fibers were plastically deformed.

Figure 6A:
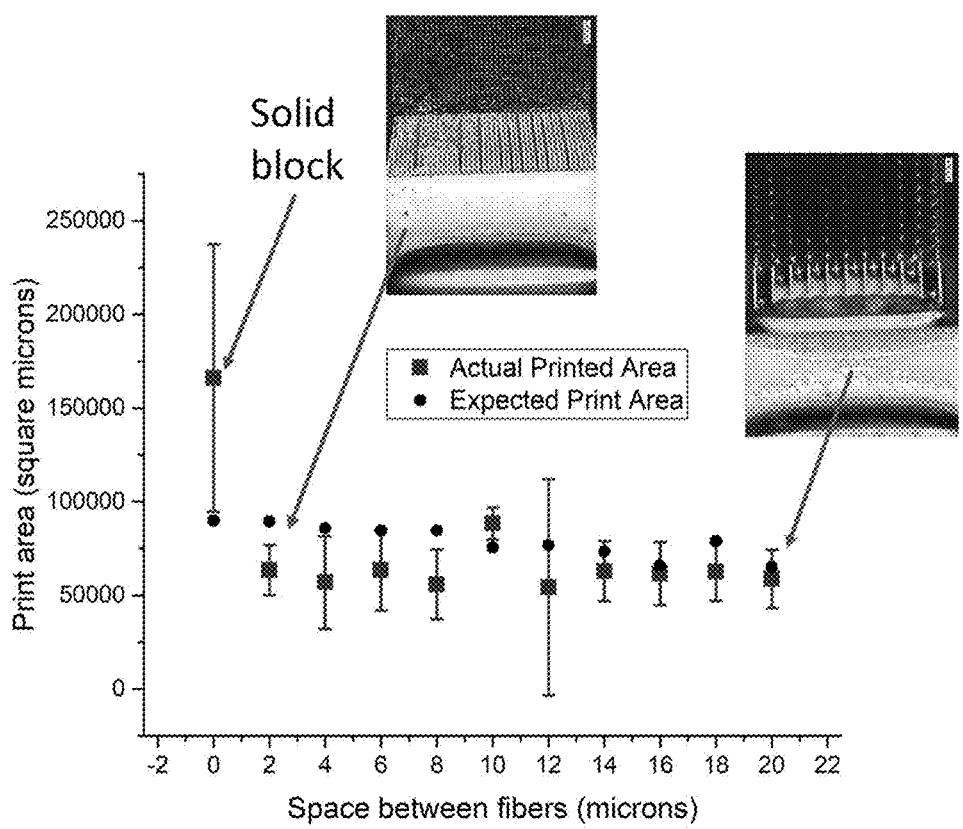
FIG. 6A-6B shows printing results with fiber-based printing elements. Provided is (A) a graph showing the measured and expected print area for stamps including 5×100 µm (diameter×height) fibers at varying density. At a high density (small space between fibers), capillary forces draw the fibers together (left image). At a lowest density of 20 microns between fibers (right image), they remain separate after inking. Also provided is (B) a graph showing film thickness versus fiber spacing. Data for "0 space between fibers"
Figure 6B:
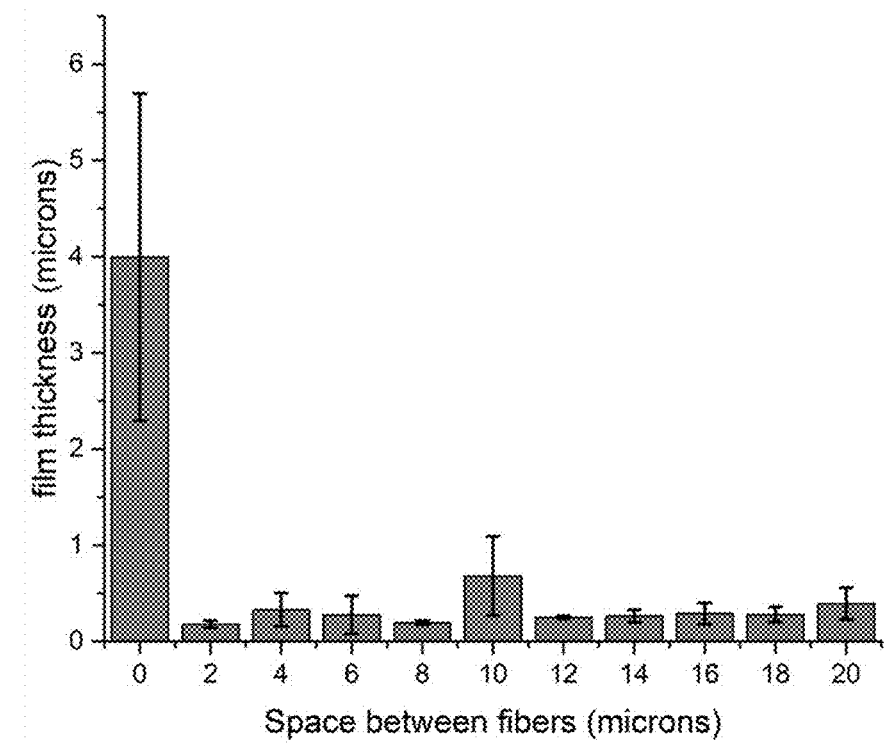

Thus, 5×100 $\mu m$ (diameter x height) fibers were used as building blocks to examine printing with fibrous structures. As a first step, ink transfer with solid square blocks and with fiber-based blocks were compared, which included an ink transfer component having fibers with varying density. A stamp footprint of 300 $\mu m$×300 $\mu m$ was chosen, which corresponds to a single scan area with the 25× (i.e., no stitching in the stamp) and is large enough to quantify parameters of interest such as print area (print fidelity) and film thickness (material transfer). FIG. 6A-6B shows the results of this experiment. The solid block consistently overprinted the expected area and transferred more material in comparison to the fibrous stamps. Indeed, the fibrous stamps, regardless of spacing (density of fibers) printed with greater fidelity (close to target area of print) as well as uniform film thickness. This is a promising result in that it demonstrates the capability to fabricate porous stamps and the advantages of porosity to deliver thin films versus conventional solid materials currently used for flexo.

FIG. 7A-7B shows two examples of ink transfer using a solid, 300×300 block and a fibrous stamp with 16 µm spacing. As seen in FIG. 7A, the solid block stamp results in an overprinted area while the fiber stamp shows significant under printing. As seen in FIG. 7B, the fibers are drawn towards the center following inking resulting in a smaller stamp footprint than the 'expected' area (i.e., footprint of pre-inked fibers). By determining the maximum spacing before the fibers remain independent, this brush-like microstamping could prove enabling for repeated printing before needing to re-ink with expected print areas predetermined from the inked footprint. Indeed, other groups have shown how capillary induced self-assembly of micro-fibers can be predictably tuned (see, e.g., Kang S H et al., "Meniscus lithography: evaporation-induced self-organization of pillar arrays into moiré patterns," *Phys. Rev. Lett.* 2011; 107(17): 177802 (5 pp.)).

Example 5: Characterization of Stamps Based on Poisson's Ratio

Next, fiber-based stamps were designed that would display predictable behavior upon compression. FIG. 8A-8B shows cross-sectional views of stamps designed to display positive Poisson's ratio (PPR; FIG. 8A) and negative Poisson's ratio (NPR; FIG. 8B) upon compression from the top side (e.g., compression applied to the distal portion of the ink transfer component). Fibers (or printing elements) comprised of stacked unit cells were varied in density in either 3× 3, 4×4, and 5×5 arrays. The overarching motivation of this experiment was to examine compression-induced transfer using 'sponges' that would direct ink toward or away from the print surface during stamping to enable a metering mechanism for deposition.

FIG. 8C-8D shows example prints from these two stamps. At first glance, the NPR stamped area appears to match perfectly the target print area while the PPR stamp significantly overprints. Yet, FIG. 8D shows a flaw in this design, namely the irreversible misalignment of the unit cells following printing. This approach appears to provide excellent print fidelity in some instances (see, e.g., FIG. 8D). Yet, further analysis indicates significant overprinting from both stamp designs (FIG. 9A) and less control over film thickness (FIG. 9B), as compared to the simple fiber-based stamps (FIG. 6B). The deformation of the stamps (FIG. 8C-8D, image in upper right) following printing likely contributes to their unpredictability. However, similar to the simple fibers, there is no clear trend of ink transfer based on fiber density (FIG. 9B).

Figure 10A:
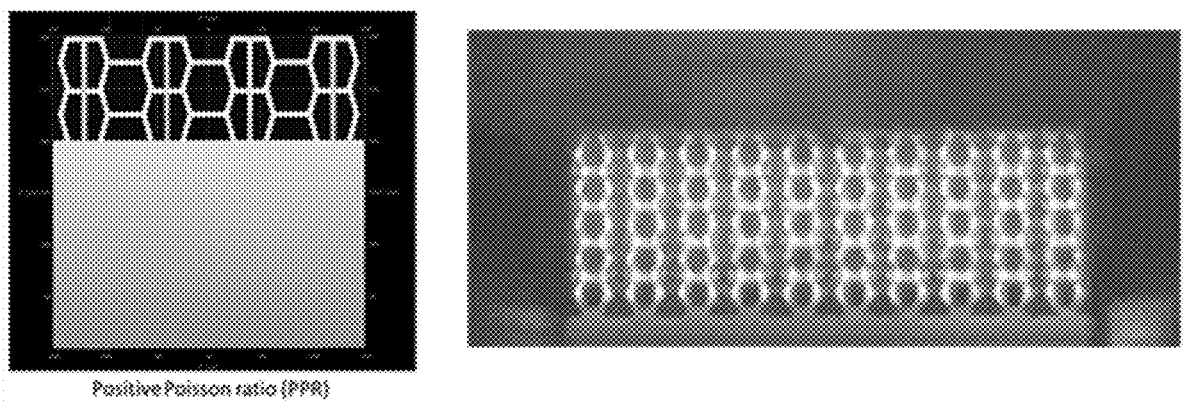
Figure 10B:
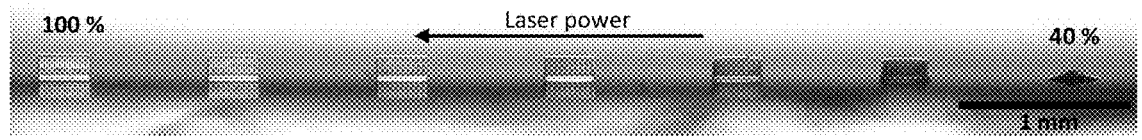

Further mechanical stability of such printing elements are provided in FIG. 10A-10E. For this study, open-cell structures were designed with buckling structures (FIG. 10A) and analyzed by micromechanical testing. Various MPL light intensities were studied to understand the effects of processing parameters on mechanical performance (FIG. 10B). Microscale compression testing (FIG. 10C) reveals a systematic evolution of mechanical properties, with higher intensity processing corresponding to increased strength (FIG. 10D) and stiffness (FIG. 10E). Importantly, the stiffness exhibits a discontinuous increase near 70% laser intensity, and this may correspond to a transition in deformation mechanism from layer buckling to homogeneous shearing.

Example 6: Stabilized Stamp Structures

Efforts to design NPR and PPR structures that would remain stable during printing are shown in FIGS. 11A-11B and FIGS. 12A-12B. These designs included a hexagonal shape, in which connectors or struts were used to improve structural integrity of individual printing elements and of the ink transfer component as a whole. The printing elements included a buckling joint to provide either an NPR or PPR structure. External struts were positioned between printing elements to provide additional structural stability.

Example 7: Development of Stamps Having Porous Reservoirs

Figure 13A:
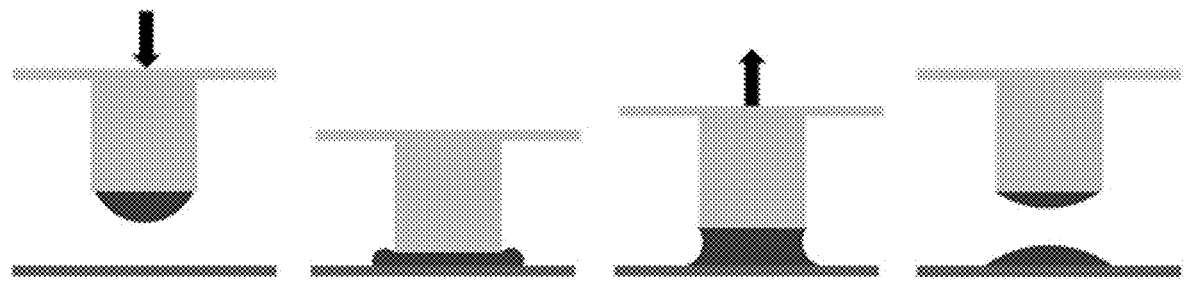
Figure 13B:
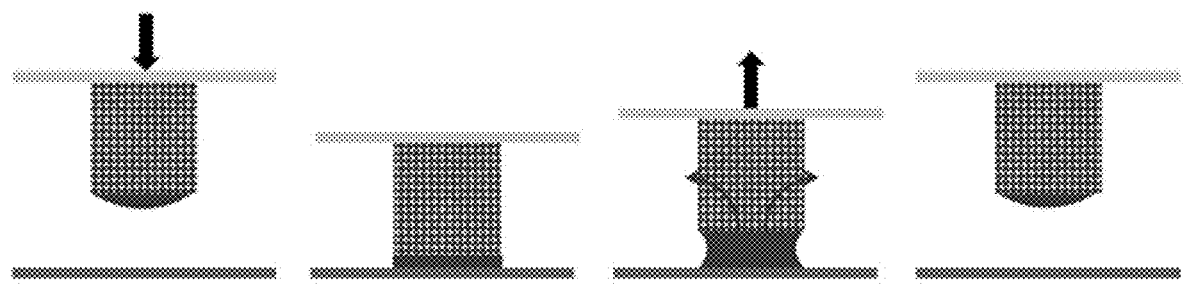
Figure 13C:
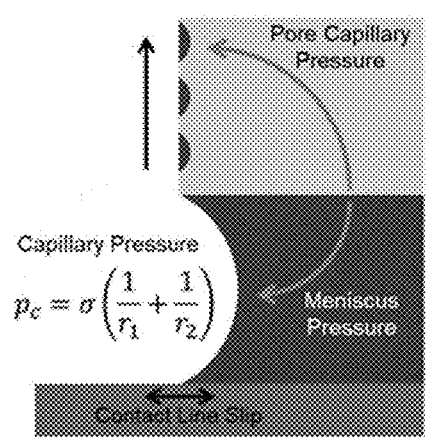
Figure 13D:
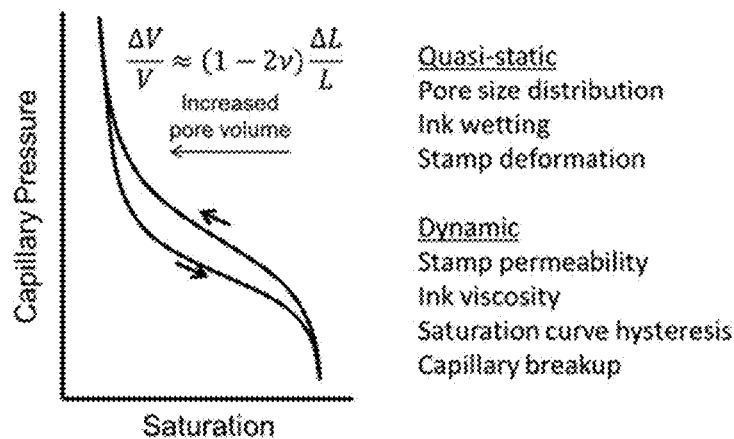

As a starting point, the differences between a simple solid and porous stamp were considered. For the conventional flexo stamp, the competition between the wetting of the stamp and the substrate drives the ink transfer process (FIG. 13A). During the flexo process, key steps include inking of the stamp, contact with the substrate, take away of the stamp, and deposition of the ink on the substrate. For a porous stamp (e.g., a stamp having a porous reservoir), capillary forces provide a suction force to imbibe ink (FIG. 13B), particular during the take away step (see, e.g., Morrow N R, "Physics and thermodynamics of capillary action in porous media," *Ind. Eng. Chem.* 1970; 62(6):32-56). It is this step where the capillary force of the stamps competes with the meniscus force upon takeaway. This notion is described schematically in FIG. 13C. This is where the value of prescribed mechanical deformation could impact the ink transfer process as, in principle, the pore volume could increase/decrease (therefore changing the saturation for a given amount of liquid) during stamp deformation and takeaway, this could impact the saturation for a given amount of imbibed liquid. For a quasi-static process that equilibrates (FIG. 13D), the capillary forces may dominate, particularly in a competition between the meniscus pressure and the capillary pressure in the stamp. However, given a finite timescale and non-equilibrium processes, flow through the stamp (permeability, viscosity) would be important, along with relaxation/breakup of the fluid driving where/when you get necking and pinch off in the fluid. These led toward a simplified approach to examine gradient pore structures (FIGS. 14A-14B).

Considering this treatment of ink transfer using a porous stamp, an experiment was designed to examine transfer using a simple pore gradient. A compliant (NPR, PPR) porous ink transfer component with an approximate pore volume of 75% was stacked onto a 'reservoir' with either higher or lower pore volume (FIG. 15A). Also show in FIG. 15A are optical images of the printed stamps.

Following development, both the stamps and substrate were treated with $O_2$ plasma to increase wettability. The NPR or PPR top surface was simplified from previous designs to generate a continuous porous sponge. An NPR/PPR 2D sheet (see, e.g., Saxena K K et al., "Three decades of auxetic research-materials with negative Poisson's ratio: a review," *Adv. Eng. Mater.* 2016; 18:1847-70) was employed as the ink transfer component, extruded across the stamp face, and hollowed out to generate a 75% pore volume.

The change in pore structure of the side walls during compression/lift off was expected to impact capillary pressure dynamically during the print process. However, FIG. 15B shows that the reservoir pore is the dominant variable that impacts ink transfer (via film thickness). Stamps on top of the smaller pore (e.g., 50% pore volume) reservoir delivered approximately twice as thick films versus stamps on top of the larger pores (e.g., 87% pore volume), regardless of whether the top was NPR or PPR. This result was not expected. It was surmised that the large pore reservoir would wick into the top-side of the stamp, resulting in increased material transfer versus the small pore reservoir. However, the film widths were measured following an initial priming of the stamp (pre-stamping 3 to 4 times) to rid of excess meniscus fluid at the top of the stamp. It is conceivable that that large pore reservoir could drain more efficiently during this priming step resulting in less material transfer after >2 compressions. Nonetheless, the data clearly indicates the significance of varying the reservoir porosity on ink transfer. Further, the pore volume and capillary pressure (e.g., pore diameter) in the reservoir can be varied and simulations (FIG. 16) can be used to guide stamp design.

Other Embodiments

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. An architected stamp having a proximal end and a distal end, comprising:
a porous reservoir comprising a plurality of first pores and a contact surface disposed at a distal portion of the porous reservoir, wherein the plurality of first pores is in fluidic communication with the contact surface; and
an ink transfer component comprising a plurality of printing elements, wherein each of the plurality of printing elements includes one or more compressible structures in fluidic communication with the contact surface at a proximal portion of the ink transfer component and which can be mechanically deformed to deliver ink to a substrate at a distal portion of the ink transfer component and wherein the proximal portion of the ink transfer component is separated from distal portion of the porous reservoir by the contact surface.

2. The stamp of claim 1, wherein the porous reservoir further comprises a plurality of second pores, and wherein a diameter of the plurality of first pores is different than the diameter of the plurality of second pores.

3. The stamp of claim 1, wherein the porous reservoir has a pore volume of from about 50% to about 95%.

4. The stamp of claim 1, wherein the plurality of first pores have a pore diameter of from about 1 µm to about 50 µm.

5. The stamp of claim 1, further comprising an external strut disposed between at least two of the plurality of printing elements.

6. An architected stamp having a proximal end and a distal end, comprising:
a reservoir comprising a contact surface disposed at a distal portion of the reservoir; and
an ink transfer component comprising a plurality of printing elements, wherein each of the plurality of printing elements is in fluidic communication with the contact surface at a proximal portion of the ink transfer component and wherein the proximal portion of the ink transfer component is separated from the distal portion of the reservoir by the contact surface.

7. The stamp of claim 6, wherein the reservoir comprises a porous reservoir comprising a plurality of first pores, and wherein the plurality of first pores is in fluidic communication with the contact surface.

8. The stamp of claim 7, wherein the porous reservoir further comprises a plurality of second pores, and wherein a diameter of the first pore is different than the diameter of the second pore.

9. The stamp of claim 7, wherein the porous reservoir has a pore volume of from about 50% to about 95%.

10. The stamp of claim 6, further comprising an external strut disposed between at least two of the plurality of printing elements.

11. The stamp of claim 6, wherein each printing element comprises a plurality of printing cells and each printing cell has a negative Poisson's ratio.

12. The stamp of claim 11, wherein the printing cell comprises a re-entrant honeycomb cell.

13. The stamp of claim 11, further comprising an internal strut disposed within at least one printing cell.

14. A method of printing comprising:
providing an architected stamp having a proximal end and a distal end,
comprising
a porous reservoir comprising a plurality of first pores and a contact surface disposed at a distal portion of the porous reservoir, wherein the plurality of first pores is in fluidic communication with the contact surface; and
an ink transfer component comprising a plurality of printing elements, wherein each of the plurality of printing elements includes one or more compressible structures in fluidic communication with the contact surface at a proximal portion of the ink transfer component and wherein the proximal portion of the ink transfer component is separated from the distal portion of the porous reservoir by the contact surface;
applying an ink to the stamp, thereby delivering the ink to the plurality of first pores of the porous reservoir; and
contacting a distal portion of the ink transfer component to a substrate, thereby mechanically deforming the plurality of printing elements and transferring the ink from the plurality of pores to the plurality of printing elements and then to the substrate.

15. The method of claim 14, wherein the ink comprises a colloidal ink.

16. The method of claim 14, wherein the architected stamp is produced by additive manufacturing.

17. The method of claim 14, further comprising, after the providing step:
   treating the stamp to provide an ink transfer component comprising a hydrophilic surface.

18. The method of claim 14, further comprising, after the contacting step:
   lifting away the stamp, thereby decompressing the plurality of printing elements and wicking ink back into the stamp.

19. The stamp of claim 1, wherein each of the plurality of printing elements has a negative Poisson's ratio.

\* \* \* \* \*